United States Patent
Chukka et al.

(10) Patent No.: US 9,818,190 B2
(45) Date of Patent: Nov. 14, 2017

(54) WHOLE SLIDE IMAGE REGISTRATION AND CROSS-IMAGE ANNOTATION DEVICES, SYSTEMS AND METHODS

(71) Applicant: Ventana Medical Systems, Inc., Tucson, AZ (US)

(72) Inventors: Srinivas Chukka, San Jose, CA (US); Anindya Sarkar, Sunnyvale, CA (US); Bikash Sabata, Cupertino, CA (US); Quan Yuan, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 14/775,582

(22) PCT Filed: Mar. 12, 2014

(86) PCT No.: PCT/EP2014/054781
§ 371 (c)(1),
(2) Date: Sep. 11, 2015

(87) PCT Pub. No.: WO2014/140070
PCT Pub. Date: Sep. 18, 2014

(65) Prior Publication Data
US 2016/0019695 A1 Jan. 21, 2016

Related U.S. Application Data

(60) Provisional application No. 61/781,008, filed on Mar. 14, 2013.

(51) Int. Cl.
*G06K 9/00* (2006.01)
*G06T 7/00* (2017.01)
(Continued)

(52) U.S. Cl.
CPC ........ *G06T 7/0014* (2013.01); *G06K 9/00127* (2013.01); *G06K 9/46* (2013.01);
(Continued)

(58) Field of Classification Search
CPC ............. G06T 7/00; G06T 11/60; G06K 9/46; G06K 9/62
(Continued)

(56) References Cited

U.S. PATENT DOCUMENTS

| 6,061,476 A | * | 5/2000 | Nichani | G06K 9/38 |
| | | | | 382/145 |
| 2003/0118222 A1 | * | 6/2003 | Foran | G06F 19/321 |
| | | | | 382/128 |

(Continued)

FOREIGN PATENT DOCUMENTS

EP 2634749 A2 9/2013

OTHER PUBLICATIONS

Dhuntao, W. et al., A hierarchical approach for image registration using line features, SPIE Proceedings, (2008), ). 72851 HI-72851 H7, vol. 7285.*

(Continued)

*Primary Examiner* — Gregory F Cunningham
(74) *Attorney, Agent, or Firm* — Ventana Medical Systems, Inc.

(57) ABSTRACT

The disclosure relates to devices, systems and methods for image registration and annotation. The devices include computer software products for aligning whole slide digital images on a common grid and transferring annotations from one aligned image to another aligned image on the basis of matching tissue structure. The systems include computer-implemented systems such as work stations and networked computers for accomplishing the tissue-structure based image registration and cross-image annotation. The methods (Continued)

include processes for aligning digital images corresponding to adjacent tissue sections on a common grid based on tissue structure, and transferring annotations from one of the adjacent tissue images to another of the adjacent tissue images.

23 Claims, 27 Drawing Sheets

(51) Int. Cl.
    *G06K 9/46*     (2006.01)
    *G06K 9/62*     (2006.01)
    *G06T 7/33*     (2017.01)
    *G06T 7/38*     (2017.01)
    *G06T 11/60*     (2006.01)

(52) U.S. Cl.
    CPC .............. *G06K 9/6201* (2013.01); *G06T 7/33* (2017.01); *G06T 7/38* (2017.01); *G06T 11/60* (2013.01); *G06T 2200/24* (2013.01); *G06T 2207/30024* (2013.01)

(58) Field of Classification Search
    USPC ......................................................... 382/128
    See application file for complete search history.

(56) References Cited

U.S. PATENT DOCUMENTS

| | | | |
|---|---|---|---|
| 2009/0028614 A1* | 1/2009 | Kerxhalli | G03G 15/0131 399/301 |
| 2012/0076390 A1* | 3/2012 | Potts | G06T 7/0014 382/133 |
| 2014/0212037 A1* | 7/2014 | Sasaki | G06T 7/408 382/167 |

OTHER PUBLICATIONS

Canny, J. "A computational approach to edge detection." IEEE Transactions on Pattern Analysis and Machine Intelligence, vol. PAMI-8, No. 6, pp. 679-698, (1986).

Borgefors, G. "Distance transformations in digital images." Computer vision, graphics, and image processing, vol. 34, No. 3, pp. 344-371, (1986).

Otsu, N. "A threshold selection method from gray-level histograms." Automatica 11.285-296 (1975): 23-27.

Hu, M. "Visual pattern recognition by moment invariants." IRE Transactions on Information Theory, vol. 8, No. 2, pp. 179-187, (1962).

Samet, H. and Tammien, M. "An improved approach to connected component labeling of images." International Conference on Computer Vision and Pattern Recognition, pp. 312-318, (1986).

Ma, T. et al. "Boosting chamfer matching by learning chamfer distance normalization." Computer Vision—ECCV 2010, Part V, LNCS 6315, pp. 450-463, (2010).

Ruifrok, A.C., and Johnston, D.A. "Quantification of histochemical staining by color deconvolution." Analytical and quantitative cytology and histology/the International Academy of Cytology [and] American Society of Cytology, vol. 23, No. 4, pp. 291-299, (2001).

International Application No. PCT/EP2014/054781; International Search Report, mailed Sep. 23, 2014.

International Application No. PCT/EP2014/054781; Written Opinion, mailed Sep. 23, 2014.

Lippolis, G. et al., "Automatic registration of multi-modal microscopy images for integrative analysis of prostate tissue sections." BMC Cancer, vol. 13, pp. 408, (2013).

Haber, E. and Modersitzki, J., "Intensity gradient based registration and fusion of multi-modal images." Medical Image Computing and Computer-Assisted Intervention—MIC CAI 2006. LNCS 4191, pp. 726-733, (2006).

Kwak, J., et al., "Multimodal microscopy for automated histologic analysis of prostate cancer." BMC Cancer, vol. 11, pp. 62, (2011).

Zhang, Q., et al. "Perceptual object extraction based on saliency and clustering." Journal of Multimedia, vol. 5, No. 4, 393-400, (2010).

International Application No. PCT/EP2014/070927; International Search Report, mailed Feb. 16, 2015.

International Application No. PCT/EP2014/070927; Written Opinion, mailed Feb. 16, 2015.

Chappelow, J. et al. "HistoStitcher©: An interactive program for accurate and rapid reconstruction of digitized whole histological sections from tissue fragments." Computerized Medical Imaging and Graphics, vol. 35, No. 7, pp. 557-567 (2011).

Chuntao, W. et al., A hierarchical approach for image registration using line features, SPIE Proceedings, (2008), pp. 72851H1-72851H7, vol. 7285.

* cited by examiner

HE image

Soft weighted foreground image extracted from the HE image

IHC image

Soft weighted foreground image extracted
From IHC image in Fig. 17(a)

Rotated foreground HE image on a bigger grid

IHC foreground image on a bigger grid, aligned with bigger HE grid

Let rectangle A in big image grid, corresponding to image 1, be 300x300 window

Let rectangle B in big image grid, corresponding to image 2, be 375x375 window; if we shift the rectangle by 1 pixel either way, there are 75x75 possible positions of the rectangle; similarly, if we allow shifts of 5 pixels, possible positions to search= (75/5)x(75/5) = 225

WHOLE SLIDE IMAGE REGISTRATION AND CROSS-IMAGE ANNOTATION DEVICES, SYSTEMS AND METHODS

CROSS REFERENCE TO RELATED APPLICATIONS

This application is a U.S. National Phase application of PCT/EP2014/054781, filed Mar. 12, 2014, entitled "WHOLE SLIDE IMAGE REGISTRATION AND CROSS-IMAGES ANNOTATION DEVICES, SYSTEMS AND METHODS", which claims the benefit under 35 U.S.C. §119(e) of and priority to U.S. Provisional Patent Application No. 61/781,008, filed Mar. 14, 2013, which is herein incorporated by reference in its entirety.

FIELD

This specification relates to devices, systems, and methods for manipulation and/or analysis of digitized images of tissue samples. This specification also relates to devices, systems and methods for image registration of a set of digitized images of neighboring tissue section samples. And, this specification also relates to devices, systems and methods for transferring annotations from one image in the set of images of adjacent tissue section samples to other images in the set of images of adjacent tissue section samples.

BACKGROUND

Digital Pathology refers to the management and interpretation of pathology information in a digital environment. Scanning devices are used to image slides of tissue sections, which may be stained, such that digital slides, e.g., whole slide images are generated. Digital Pathology software enables digital slides to be stored in a computer memory device, viewed on a computer monitor, and analyzed for pathology information.

It is expected that Digital Pathology may enable integration of various aspects of the pathology environment such as paper and electronic records, clinical background information, prior cases, images, and results among other things. It is also expected that Digital Pathology may enable increased efficiencies such as increased workload capability, access to the right pathologist at the right time, rapid retrieval of cases and diagnoses, and improved workflow among other possible efficiencies. However, there are a number of impediments to the widespread adoption of Digital Pathology and the promise of its various benefits, such as imaging performance, scalability and management.

While certain novel features are shown and described below, some or all of which may be pointed out in the claims, the devices, systems and methods of this disclosure are not intended to be limited to the details specified, since a person of ordinary skill in the relevant art will understand that various omissions, modifications, substitutions and changes in the forms and details of the illustrated embodiments and in their operation may be made without departing in any way from the spirit of the disclosure. No feature described herein is critical or essential unless it is expressly stated as being "critical" or "essential."

SUMMARY

The present disclosure provides devices, systems and methods for the manipulation and/or analysis of digitized images of tissue samples. For example, the present disclosure provides devices, systems and methods for computerized image registration of digital slides corresponding to adjacent tissue sections, and/or for transferring annotations from at least one of the digital slides to at least one other of the digital slides.

In some embodiments, the devices include a computer program product for aligning images which are part of a set of digital images of adjacent tissue sections, and/or mapping annotations between aligned images. Each image in the set may be obtained using a different stain (or label, hereinafter "stain"), a different imaging mode, or both. In some embodiments, the computer program product includes a tangible computer readable storage medium having a computer readable program code embedded therein, the computer readable program code is configured to align selected digital images in the set resulting in a set of aligned digital images using an image registration process (i.e., a process that is directed to, for example, transforming different sets of data into one coordinate system) based on matching tissue structure; and the computer readable program code may also be configured to transfer an annotation from at least one digital image in the set of aligned digital images to at least another one of the digital images in the set of aligned images. In other embodiments, the computer program product includes a tangible computer readable storage medium having a computer readable program code embedded therein, the computer readable program code is configured to align a first digital image from the set of digital images of adjacent tissue sections and a second digital image from the set resulting in an aligned image pair using an image registration process based on matching tissue structure; and the computer readable program code may also be configured to transfer an annotation from one of the first or second digital images in the aligned pair to the other of the first or second digital images in the aligned pair.

In further embodiments, matching tissue structure involves computing a soft weighted foreground image for each of the selected images in the set of digital images of adjacent tissue sections (for example, computing a soft weighted foreground image for each of a first and second digital image), extracting a binary tissue edge-map for each of the resultant foreground digital images (for example for each of the first and second foreground digital images), and computing global transformation parameters based on the tissue edge maps (for example, based on the first and second tissue edge-maps). In further embodiments, matching tissue structure also involves mapping at least a portion of the originally selected images (for example, the first image and the second image) to a common grid based on the global transformation parameters. In further embodiments, the center of the common grid coincides with the center of the foreground images.

In other embodiments, transferring an annotation includes mapping an annotation from at least one of the aligned images (for example, from the first image or source image) to a corresponding location on at least another of the aligned images (for example, the second image or target image) based on the common grid (which in some embodiments may be the grid of a specific image such as the target image). In further embodiments, transferring the annotation further comprises refining the location of the transferred annotation based on a fine registration process. In further embodiments, the fine registration process includes identifying a window around the original annotation in the source image (for example the first image of an aligned pair of images), identifying a second but larger window in a corresponding location in the target image (for example the second image of an aligned pair of images), and iteratively shifting a third window corresponding to the first window within the second window and identifying an optimal location for the third window. In further embodiments, identifying the optimal location is based on distance transformation and cost function calculations.

In some embodiments, the systems include a processor; a memory containing instructions for execution by the processor, which if executed by the processor provide the following results: aligning a first image and second image based on tissue structure, wherein the first image and second image are part of a set of images of adjacent tissue sections and wherein each image in the set may be prepared using a different stain, a different imaging mode, or both; and/or replicating an annotation (for example a pre-existing annotation and/or a user-marked annotation) on one of at least the first image or second image on the other of at least the first image or second image; a client user interface for triggering the processor to execute the instructions; and a monitor for displaying the client user interface, the images, the results, or combinations thereof. In some embodiments, the system is implemented on a computer workstation. In some embodiments, the system is implemented using a computer network.

In some embodiments, the methods include an image registration process involving selecting images from a set of digital images of adjacent tissue sections and aligning the selected images using a registration process based on tissue matching. Each digital image may be obtained using a different stain, a different imaging mode, or both as compared to another digital image in the set. In further embodiments, the image registration process includes selecting a first digital image of a first tissue section from a set of digital images of adjacent tissue sections of a single patient; selecting a second digital image of a second tissue section from the set; and performing a registration process based on matching tissue structure between the first digital image and the second digital image. In some embodiments, the registration process includes a coarse registration mode. In some embodiments, the registration process also includes a fine registration mode.

In some embodiments, the coarse registration mode involves generating a first gray-level tissue foreground image from the first digital image, generating a second gray-level tissue foreground image from the second digital image, computing a first tissue binary edge-map from the first gray-level foreground image, computing a second tissue binary edge-map from the second gray-level foreground image, computing global transformation parameters to align the first binary tissue edge-map and the second binary tissue edge-map, and mapping the first digital image and the second digital image to a common grid based on the global transformation parameters. In further embodiments, computing the global transformation parameters includes using a moments-based mapping method to generate an affine mapping between the first tissue binary edge-map and the second tissue binary edge-map. In some embodiments, the fine registration process includes annotating the first digital image, mapping the annotation on the common grid to a corresponding location on the second digital image, and updating the location of the annotation on the second image using Chamfer distance-mapping based on the binary tissue edge-maps.

In some embodiments, the methods are a method for mapping an annotation from a first digital image from a set of digital images of adjacent tissue sections to a second digital image in the set. In some embodiments, the methods involve selecting a pair of digital images which has been aligned, annotating one of the digital images in the pair if none of the selected images have previously been annotated (or optionally further annotating an image if it has previously been annotated), and transferring the annotation to the other digital image in the pair. In some embodiments the mapping methods involve selecting a first image from a set of digital images of adjacent tissue sections, selecting a second image from the set, instructing a computer processor to execute instructions resulting in aligning the first image with the second image on a common grid using a coarse registration process based on matching tissue structure, for example as described further herein, annotating the first image if it has not already been annotated (or optionally further annotating the first image if it already has been annotated), and instructing the computer processor to transfer the annotation to the second image. In some embodiments, transferring the annotation occurs automatically, and may occur substantially simultaneously with an initial registration process (for example a coarse registration process) if an image in the pair to be registered has been annotated, or it may occur substantially simultaneously with annotating the first image. In some embodiments, transferring the annotation occurs after the first and second images have been aligned. In some embodiments, transferring the annotation further comprises adjusting the location of the annotation on the second image based on a fine registration process, for example as further described herein. In some embodiments of the present invention, annotations present on a first image (for example, drawings or notes associated with the image in a memory associated with a computer) are automatically mapped to a second image. In some embodiments of the present invention, a user manually adjusts, via a computer interface or program (for example, an image viewer software application), at least one of a location, size and shape of the annotation transferred by the computer processor.

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

DETAILED DESCRIPTION

Figure 1:
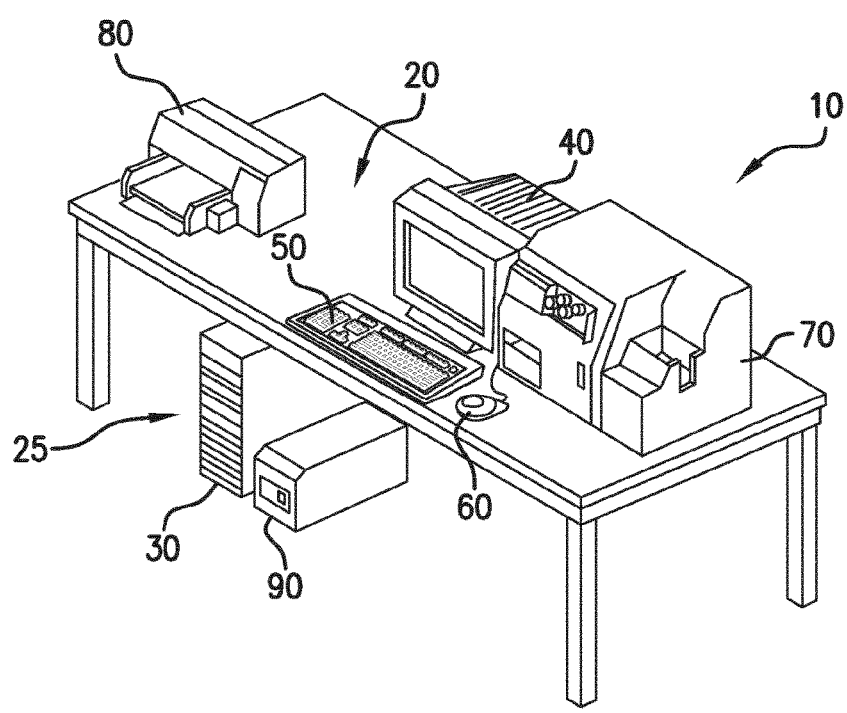
FIG. 1 is a perspective, pictorial representation of an embodiment of a medical imaging workstation system in which the devices, systems and methods according to this disclosure may be implemented.

Detailed descriptions of one or more embodiments are provided herein. It is to be understood, however, that the devices, systems and methods according to this disclosure may be embodied in various forms. Therefore, specific details disclosed herein are not to be interpreted as limiting, but rather as a representative basis for the claims and for teaching one skilled in the art to employ the present devices, systems and methods in any appropriate manner.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrase "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited.

The term "about" is meant to account for variations due to experimental error. All measurements or numbers are implicitly understood to be modified by the word about, even if the measurement or number is not explicitly modified by the word about.

The terms "comprising" and "including" and "having" and "involving" and the like are used interchangeably and have the same meaning Similarly, "comprises", "includes," "has," and "involves") and the like are used interchangeably and have the same meaning Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c.

Where ever the terms "a" or "an" are used, "one or more" is understood unless explicitly stated otherwise or such interpretation is nonsensical in context.

The terms "align" and "register" and all of their forms (for example, "aligning" and "registering") are used in the alternative and mean the same thing when used in connection with the term "image". For example, the phrases "aligned images" and "registered images" are used in the alternative to describe digital images which have undergone an image registration process (for example a coarse registration and/or a fine registration process).

This disclosure relates to Digital Pathology and provides computer-implemented devices, systems and methods for digital tissue image analysis. In some embodiments, the devices, systems and methods are implemented on a stand-alone workstation (which may include a modem for access to the internet). In some embodiments, the devices, systems and methods may be implemented over a computer network.

Whether implemented on a stand-alone workstation or over a network, the systems according to this disclosure may include at least some of the following hardware components: a computer comprising an output device for displaying images and/or results such as a monitor and one or more input devices such as a keyboard and mouse or trackball for interacting with software programs, and a processor for executing the software programs. The systems may also include a storage device for storing sets of digital image files, wherein each set includes one or more whole slide images of adjacent tissue sections of the same tissue of a single patient. Each digital image file in a set may be generated from a glass slide using a different imaging mode (for example brightfield microscopy and fluorescent microscopy), or a glass slide in which a tissue section was prepared using a different stain (for example HE, IHC stains), or both, as compared to another digital image file in the set. The storage device can be part of the computer itself or it can be a separate device such as a network-accessible storage device. The systems may also include a scanner for producing the digital image files from glass slides. In certain embodiments within the scope of this disclosure, a biological specimen (which may or may not be a tissue specimen) is placed on a substrate, which may or may not be a glass or microscope slide. In certain embodiments within the scope of this disclosure, the biological specimens (e.g., tissue specimens), which are imaged and compared, may not originate from the same section or block of a patient. In certain embodiments within the scope of this disclosure, the digital images that are registered and available for use in accordance with methods within the scope of this disclosure may be images of non-adjacent tissue sections from a single patient. In certain embodiments within the scope of this disclosure, the digital images that are registered and available for use in accordance with methods within the scope of this disclosure may be images of biological specimens from different patients.

Whether implemented on a stand-alone workstation or over a network, the systems may also include the following software components: an image analysis program comprising a registration module (which may include a coarse registration module and/or a fine registration module), an annotation module or both. The registration module, when executed by the processor, results in aligning at least two digital images in a set of digital images of adjacent tissue sections thereby creating a set of aligned digital images. The annotation module, when executed by the processor, results in mapping an annotation on at least one of the digital images in the set of digital images of adjacent tissue sections to at least another one of the digital images in the set. In some embodiments, the annotation module, when executed by the processor, results in annotating at least one of the digital images and/or mapping an annotation on at least one of the digital images to at least another of the digital images. In some embodiments, the registration module is executed substantially simultaneously with the annotation module. For example, a request to map an annotation from one slide to another slide causes the processor to both align and map an annotation from at least one of the images to at least another of the images. In some embodiments, the annotation can be pre-existing on the source image. In some embodiments, the annotation is user-generated in the image analysis program, by for example, selecting an image as the source image and annotating that image using the image analysis program. In some embodiments, the registration module is executed prior to the annotation module. For example, the annotation module, when executed by the processor results in mapping an annotation from at least one digital image that is part of a set of aligned images to at least one other digital image that is part of the set of aligned images. The systems also include an image viewing module, which may be part of the image analysis program and enables a user to access one or more digital image files, view the files on the monitor(s), and in some embodiments, manipulate the digital slides using a client user interface. In an exemplary embodiment of the present invention, a user may manually edit and/or adjust an annotation (for example, the location, size and shape of the annotation), which was generated by the annotation module, via a computer interface or computer input device.

Computer-implemented methods according to this disclosure comprise: a computer-implemented registration process for aligning at least two digital images from the same tissue block, section, or sample of a single patient based on tissue structure resulting in a set of aligned digital images, wherein each digital image in the set may be derived from an image obtained using a different stain, a different imaging mode, or both as compared to the other digital images in the set; and, a computer-implemented mapping process for mapping an annotation on at least one of the digital images in the set of aligned digital images to at least another of the digital images in the set of aligned digital images. In some embodiments, the image registration process and the annotation process occur substantially coextensively. For example, an instruction to map an annotation from one digital slide to another results in both aligning the slides and annotating the slides, for example the annotation instruction results in first aligning the images and then transferring the annotation from one image to the other image. In some embodiments, the image registration process occurs first, and the annotation process is initiated by first selecting at least a pair of aligned images and next annotating at least one of the images in the at least one pair of aligned images. In some embodiments, the registration process comprises a coarse registration process. In some embodiments, the registration process comprises a coarse registration process and a fine registration process. In further embodiments, the annotation of the source image is done before the fine registration module is used and/or before the coarse registration process is used. Thus, for example, in some embodiments, wherein a user desires simultaneous viewing of both a source and a target image, the coarse registration process may be invoked to perform global registration of both images, without needing any specific annotations. In some embodiments, wherein a user desires to return user-marked annotations of a source image to a target image, a fine registration process may be invoked, for example in regions close to the user annotations, to improve alignment of the source and target images as compared to just relying on a coarse registration.

In some embodiments, the coarse registration process may involve selecting digital images for alignment, generating a gray-scale image from each of the selected digital images, and matching tissue structure between the resultant gray-scale images. In further embodiments, generating a gray-scale image involves generating a soft-weighted foreground image from the whole slide image of a stained tissue section. In other embodiments, matching tissue structure involves extracting a tissue-edge binary map from each of the resultant gray-scale images and computing global transformation parameters for aligning the tissue-edge binary maps. In some embodiments, the global transformation parameters are computed using a moments-based mapping method to generate an affine mapping between the first binary tissue edge-map and the second binary tissue edge-map. In yet further embodiments, the coarse registration process includes mapping the selected digital images based on the global transformation parameters to a common grid, which grid may encompass the selected digital images. In some embodiments, the fine registration process may involve identifying a first sub-region of a first digital image in the set of aligned digital images, for example a sub-region comprising an annotation; identifying a second sub-region on a second digital image in the set of aligned digital images, wherein the second sub-region is larger than the first sub-region and the first sub-region is located substantially within the second sub-region on common grid; and, computing an optimized location for the first sub-region in the second sub-region.

In some embodiments, the mapping process may involve annotating a first digital image in a set of aligned images after the coarse registration process, and mapping the annotation to a second digital image in the set of aligned digital images. In further embodiments, the location of the annotation is refined based on results of the fine registration process.

Referring now to the Figures, wherein like reference numerals refer to like parts throughout, FIG. 1 is a perspective, pictorial representation of an embodiment of a medical imaging workstation system 10 in which the devices, systems and methods according to this disclosure may be implemented. As shown, the medical imaging workstation system 10 includes a computer 20 having a housing for hardware components 30 such as a processor ("CPU") (not shown), a storage device (not shown), a graphics processor unit ("GPU") (not shown), and optionally a modem (not shown); a first output device, which in the illustrated example is a monitor 40; a first user input device, which in the illustrated example is a keyboard 50; and, a second user input device, which in the illustrated example is a pointing device for interacting with the display such as a track ball or mouse 60. As is known in the art, although the computer 20, hardware component 30, monitor 40, and user input devices 50, 60 are illustrated as separate components, they may be integrated in fewer parts such as they may all be integrated in the form of a laptop computer. The medical imaging workstation system 10 may also include additional peripherals such as a third input device, which in the illustrated example is a slide scanner 70, a second output device, which in the illustrated example is a printer 80, a back-up power supply 90, and external storage devices (not shown), among other devices which are known to be associated with computer-implemented medical imaging systems. In some embodiments, the medical imaging workstation system 10 may include more than one monitor 40 for ease of simultaneous viewing of multiple digital tissue images on multiple screens. As a person of skill appreciates, the specific components may change as technology changes. For example, a peripheral pointing device may not be necessary if the screen is responsive to a user's finger, or voice commands.

The medical imaging workstation system 10 also includes software components such as an image analysis program comprising a registration module, an annotation module or both, as well as an image viewing module which may be part of the image analysis program. The software components may be one or more files, which are stored on the storage device (for example the software components may be stored on an internal hard drive) and/or the software components may be stored on a memory disc such as a DVD, CD or memory card, which can be accessed by the processor when the memory disc is inserted into the housing 30 through a memory-disc receiving port 25.

The CPU is operatively connected to the various peripherals and hardware components, including the storage device and the GPU. The storage device may temporarily or permanently store sets of digital images, which may be imported into the system, for example by a scanning device. The sets of digital images include one or more digital images of adjacent tissue sections of a single patient, wherein each image can be obtained using a different stain/label/marker, a different imaging mode, or both as compared to another image. The GPU processes instructions from an image display program and image analysis program (which may be combined in a single program). When executed, for example by the GPU, the image display program may provide a windowed graphical user interface ("GUI") on the monitor 40 with multiple windows such that a user may interact with the GUI to provide instructions resulting in a processor, such as for example the CPU, executing one or more aspects of the image analysis program, and/or may result in displaying one or more of the stored digital images on one or more of the monitors 40, either in their native (originally-scanned) format or as modified by the image analysis program. As previously mentioned, the image analysis program comprises a registration module and an annotation module. When executed, for example by the CPU, the registration module results in aligning a least two of the stored digital images, even stored digital images that are obtained using different stains, different imaging modes, or both, on a common grid based on tissue structure, creating a set of aligned images. When executed, for example by the CPU, the annotation module results in mapping an annotation from one of the digital images in the set of aligned images to at least another of the digital images in the set of aligned images.

Figure 2:
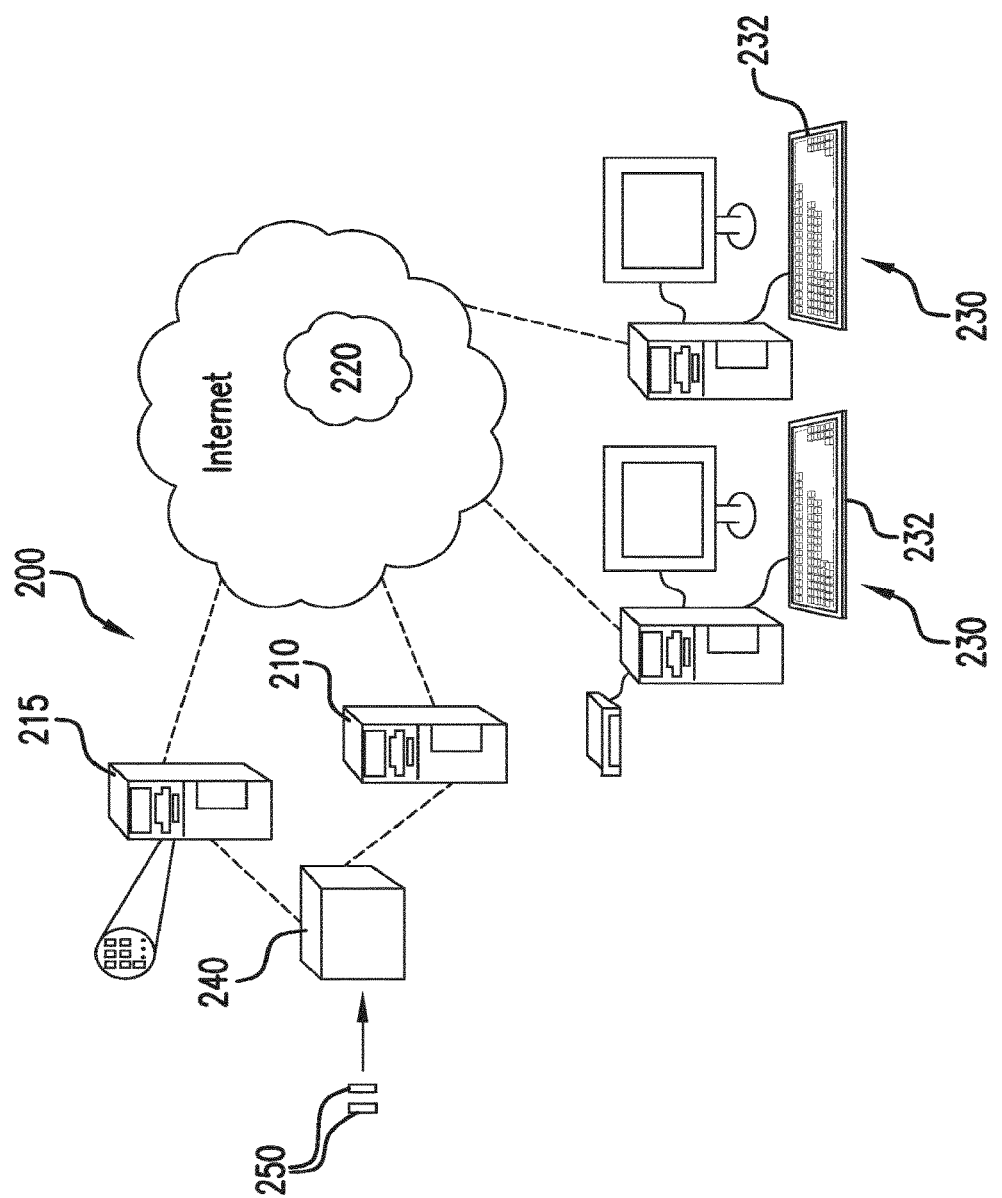
FIG. 2 is a network diagram illustrating an embodiment of a networked system in which the devices, systems and methods according to this disclosure may be implemented.

FIG. 2 is a network diagram illustrating an embodiment of a networked system in which the devices, systems and methods according to this disclosure may be implemented. As shown, the system 200 includes a database server 210 and a network-accessible storage device 215, each of which is connected to a network 220. The storage device 215 stores sets of digital images, wherein each set includes one or more digital images of adjacent tissue sections of a single patient. Each image in a set may be obtained by using a different stain, a different imaging mode or both as compared to another image in a set. One or more client computers 230, which may have associated input and output devices such as a keyboard 232, mouse (not shown) and printer (not shown) are also connected to the network 220 by any means known in the art (for example a dedicated connection, a DSL or cable modem, a wireless internet connection, a dial-up modem or the like). The client computer 230 includes a web browser which is used to access the digital images in the stored device 215. In exemplary embodiments of the present invention, cloud storage may be utilized for storing the digital images.

The client computer 230 includes at least one processor configured to execute instructions relating to an image analysis program. The image analysis program may be downloaded to the client computer 230 from the server 210. The image analysis program may include an image viewer module, which provides a client user interface such that when executed, the image viewer module may provide a windowed GUI with multiple windows that enables a user to provide instructions resulting in the processor executing one or more aspects of the image analysis program and/or may result in displaying one or more of the stored digital images, either in their originally-scanned format or as modified by the image analysis program. The image analysis program enables a user to select images for alignment (registration) in a set of images obtained from a tissue section of a single patient, but wherein each image in the set may have been made using a different stain, or a different mode or both as compared to other images in the set. The image analysis program also enables a user to annotate one or more selected digital images in the set of digital images and have those annotations mapped to one or more of the other digital images in the set of digital images. In some embodiments, the system 200 also includes a scanner 240 for scanning whole slides 250 and producing the digital images which are stored in the storage device 215.

As a person of skill understands, implementing the image analysis program in the context of a computerized network enables certain activities that may otherwise be limited by stand-alone work stations. For example, pathologists who are not co-located, and indeed may be remote from one another, may collaborate in analyzing images, or the right pathologist may be reached at the right time, independent of location.

FIGS. 1 and 2 illustrate certain elements which may be present in one or more computer system or network topologies. A person of skill understands that computer systems and networks in which devices and systems according to this disclosure may be implemented may encompass other computer system and network topologies, and may include more or less elements in those other computer system and network topologies. In other words, the embodiments of FIGS. 1 and 2 are not limiting. For example, in some embodiments, cloud storage may be used for storing the digital images.

Figure 3:
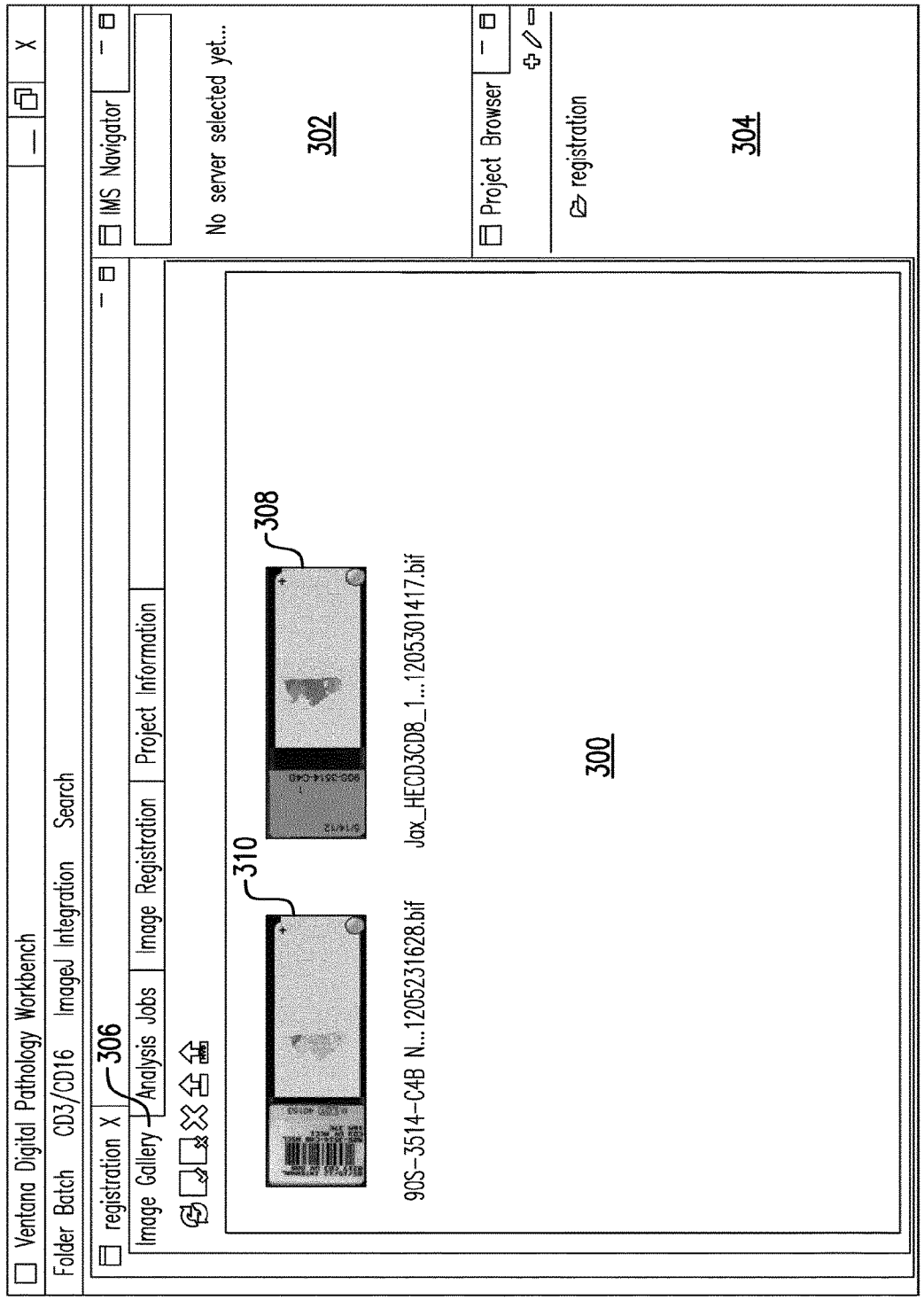
FIG. 3 is a screenshot of a home screen comprised of interactive menu bars and windows, which home screen may be part of a windowed graphical client user interface associated with an embodiment of an image analysis program in accordance with this disclosure.
Figure 4:
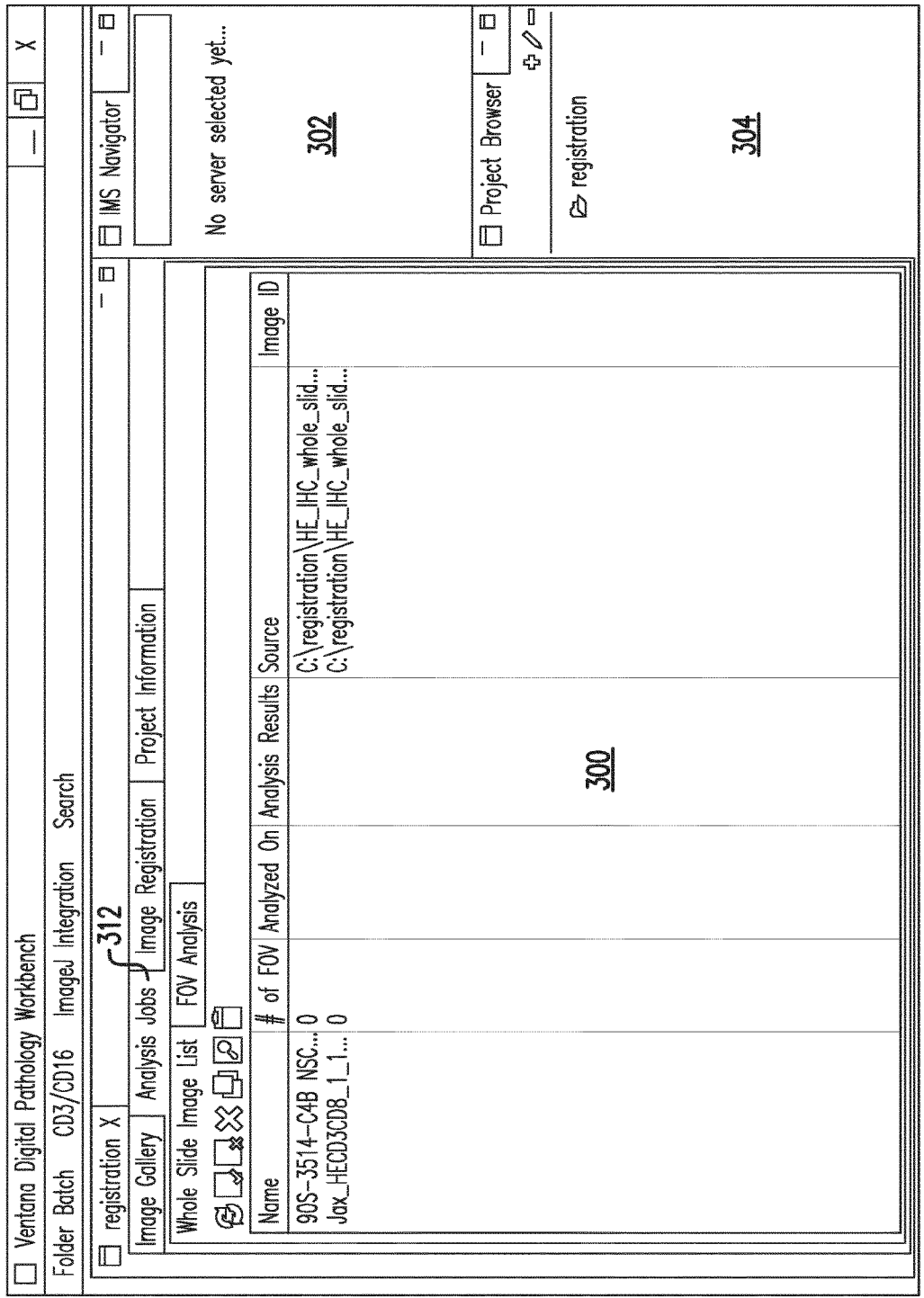
FIG. 4 is another screenshot of the home screen of FIG. 3 with a different menu option selected.
Figure 5:
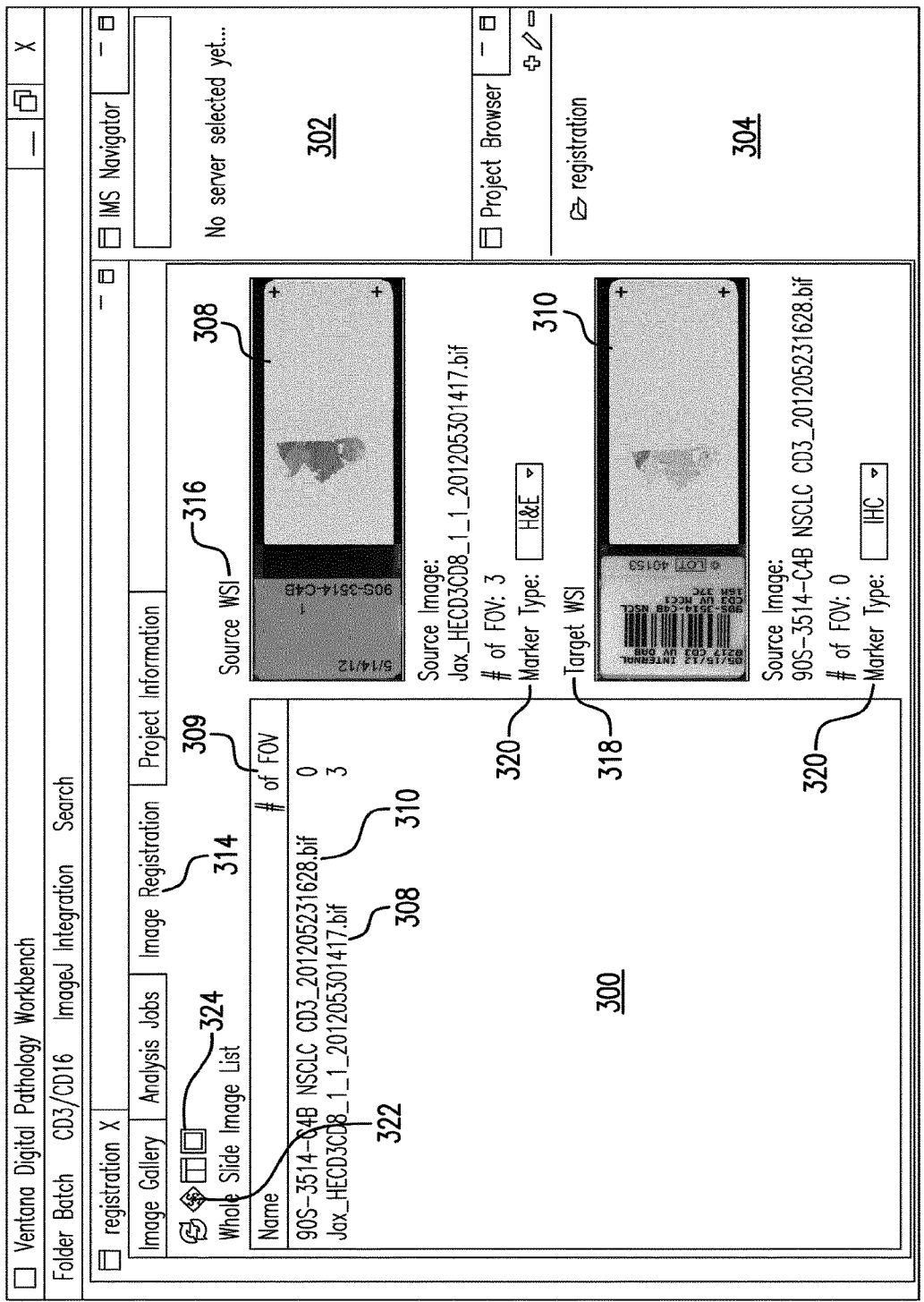
FIG. 5 is another screenshot of the home screen of FIG. 3 with yet another menu option highlighted.

FIGS. 3-5 together illustrate an embodiment of the client user interface for interacting with the processor to manage, align and/or annotate images. In the illustrated embodiment, the client user interface is implemented over two basic tools: "WorkBench" is a slide project management tool, whereas "VersoViewer" (or "Verso") is a slide viewer and annotation tool. Verso can also be used as an analysis platform because image analysis algorithms can be invoked from Verso. WorkBench and Verso are presented as an example of interface and workflow tools, based on which the registration framework is presented. However, the registration workflow is generic enough such that it can be used with and/or adapted for use with other annotation/viewer GUI tools and other image analysis/management tools.

FIGS. 3 and 4 illustrate an embodiment of a home screen for the WorkBench GUI interface, which opens when the image analysis program is launched, for example to create an analysis project for a registration problem. In the illustrated embodiment, the home screen is comprised of multiple different windows (as shown, a "registration" window 300, a "navigator" window 302, and a "project browser" window 304). Within this windowed environment, a user may select from various options in which to ultimately invoke and implement image registration, image annotation, and image and results display. The project browser window 304 helps the user to locate an already created project, for example if the user is not starting a new project, whereas the navigator window 302 helps the user to access images which, for example, may be located on a remote server. The registration window 300 includes various buttons, whose functionality is described in more detail below.

After launching the program, once a project is created, a user may select the "Image Gallery" section 306 of the Image Registration module (e.g. registration window 300), as shown in FIG. 3, to preview images being considered for registration. In the illustrated example, the Image Gallery 306 contains two images, a HE image 308 and an IHC image 310, which are displayed as a thumb nail picture of the whole slide image with the name of the whole slide image appearing below the thumb nail. However, the Image Gallery 306 can contain any number of images (e.g., limited by the storage capacity of the system), including entire sets of images taken from adjacent tissue sections. Images are added to the Image Gallery 306 according to means known in the art, for example, upon clicking the Image Gallery tab 306, images can be added by dragging and dropping them from an area of the user interface or a database into the Image Gallery 306.

As shown in FIG. 4, selecting the "Analysis Jobs" folder 312 of the registration window 300 brings up a list of images available in the Image Gallery 306 and associated information, for example the different annotations already available for images in the Image Gallery 306. In the present example, no annotations are available for any of the images in the Image Gallery 306.

As shown in FIG. 5, under the Image Registration tab 314, a user may identify an image in the project as the source image (has user annotations or will be annotated with user annotations) and a user may also identify an image in the project as a target image (the registration module will retrieve annotations for this image). In the illustrated example, the HE image 308 has been dragged and dropped into the "Source WSI" (whole slide image) panel 316 identifying the HE image 308 as the source image, and the IHC image 310 has been dragged and dropped into the "Target WSI" panel 318, identifying the IHC image as the target image. Within each WSI panel 318, the stain type for each image is input by selecting the appropriate tag option in "Marker Type" 320.

Figure 9:
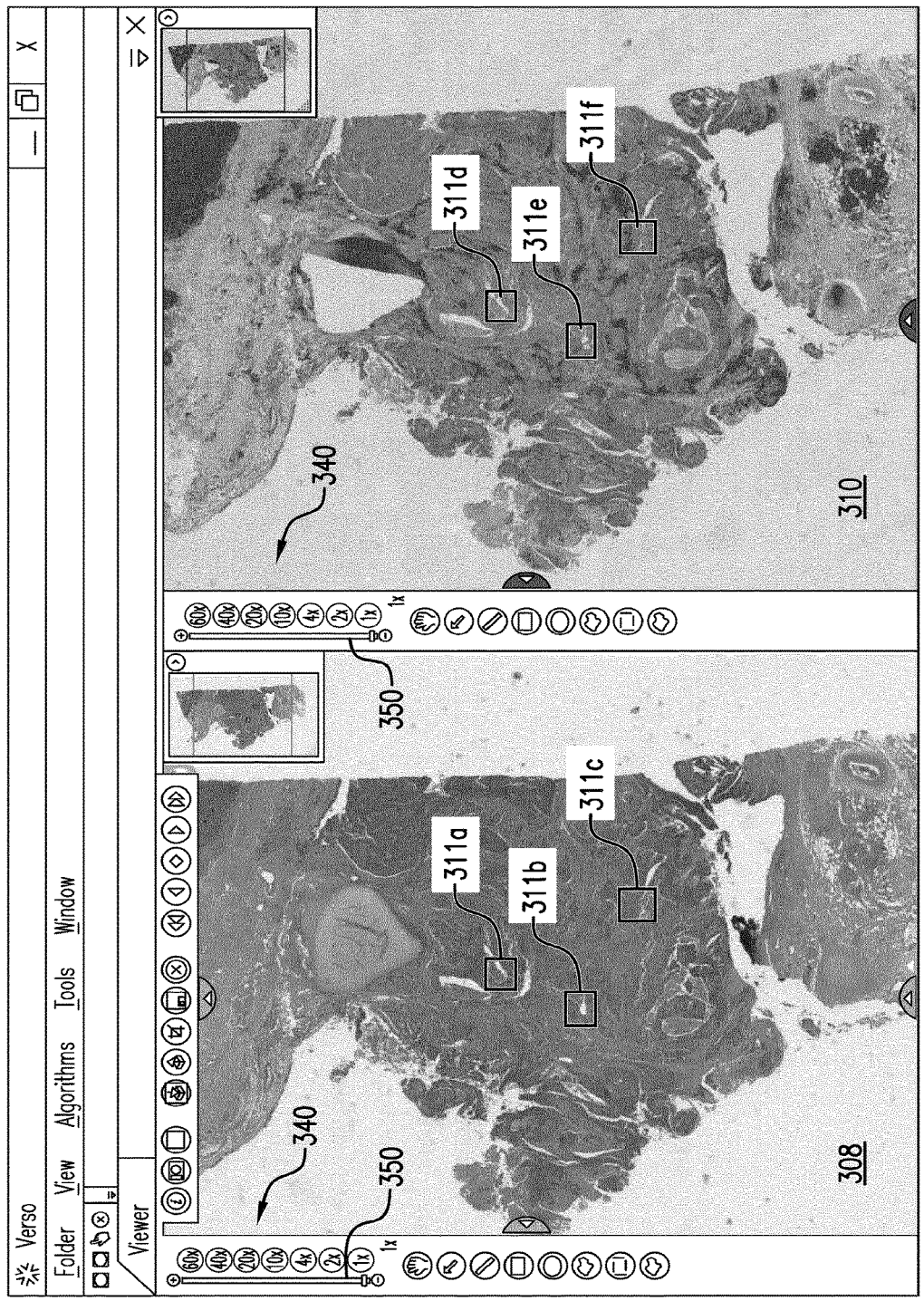
FIG. 9 is a screenshot of the annotation module GUI, which screen in the illustrated embodiment opens automatically after registration has been performed.

If the source image already contains user annotations, the registration routine may be invoked by clicking on the "Analysis" button 322 under the Image Registration tab 314. The side-by-side FOV viewing button 324, also under the Image Registration tab 314, provides side-by-side viewing of matched Field of Views ("FOV"s) from source and target images, enabling a user to compare the user-marked FOV with the algorithm-retrieved FOV, in the target image. In the exemplified embodiment, once the analysis button 322 is clicked and registration is complete, Verso Viewer automatically launches and displays the source 308 and target 310 images side-by-side, as shown in FIG. 9.

Figure 6:
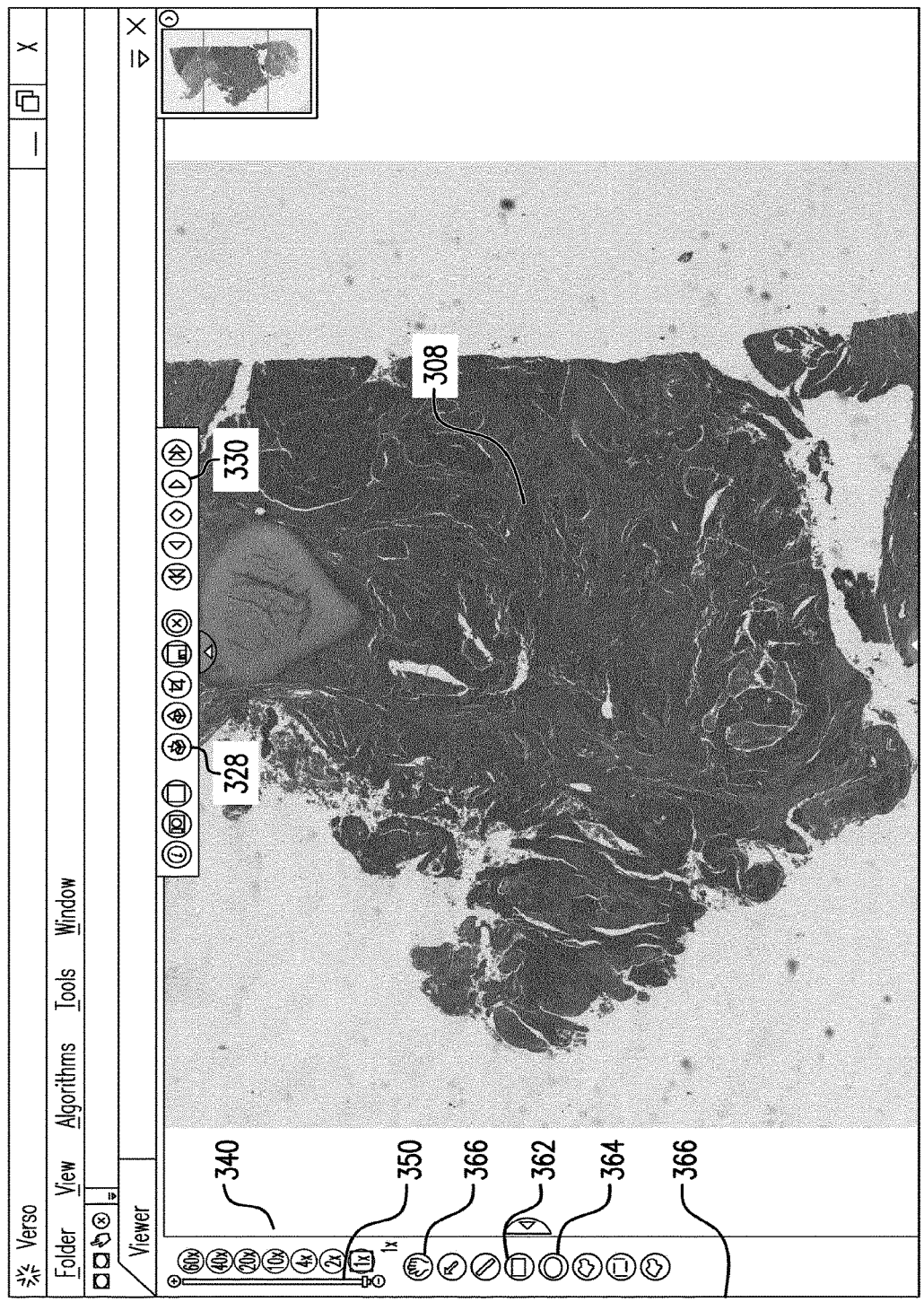
FIG. 6 is a screenshot of an embodiment of the annotation module GUI in which a digital slide may be viewed and annotated, and which may be launched from the home screen of FIG. 3.

When user annotations are not present, the user may open the source image in a viewer and mark regions of interest (create annotations). More specifically, as shown in FIG. 6, double-clicking on the source image launches a viewer interface (Verso Viewer) associated with the annotation module in which the source image (the HE image in the illustrated embodiment) is displayed and in which the source image can be manipulated and/or annotated. As illustrated, the Verso Viewer GUI includes a "Viewer" window 326 having a menu bar and a number of icons to facilitate a user's interaction with the displayed image, annotation module, and overall registration and annotation program. For example, import button 328 enables a user to import annotations, play button 330 enables a user to go from one annotation to the next, zoom buttons 340 and slider 350 enable a user to view the whole slide image at various resolutions. Furthermore annotations can be made, for example, using the annotation tool 360, which can be used to make rectangular, elliptical or polyline-based (like free hand drawing) regions using the rectangular 362, elliptical 364, or free-hand drawing 366 buttons respectively. Once the source image has at least one FOV marked, and after the marked annotations have been saved, a user can proceed with registration (for example, by clicking on the "Analysis" button 322 under the Image Registration tab 314 in the WorkBench environment).

In some embodiments, Verso Viewer may be opened independently. However, for ease of usability, double clicking on the source image in WorkBench results in opening the image in the Verso Viewer tab. As an example, if the viewer is opened first, the source image can be dragged and dropped into the viewer window; alternatively, the File->Open menu can be used to open the image.

Figure 7:
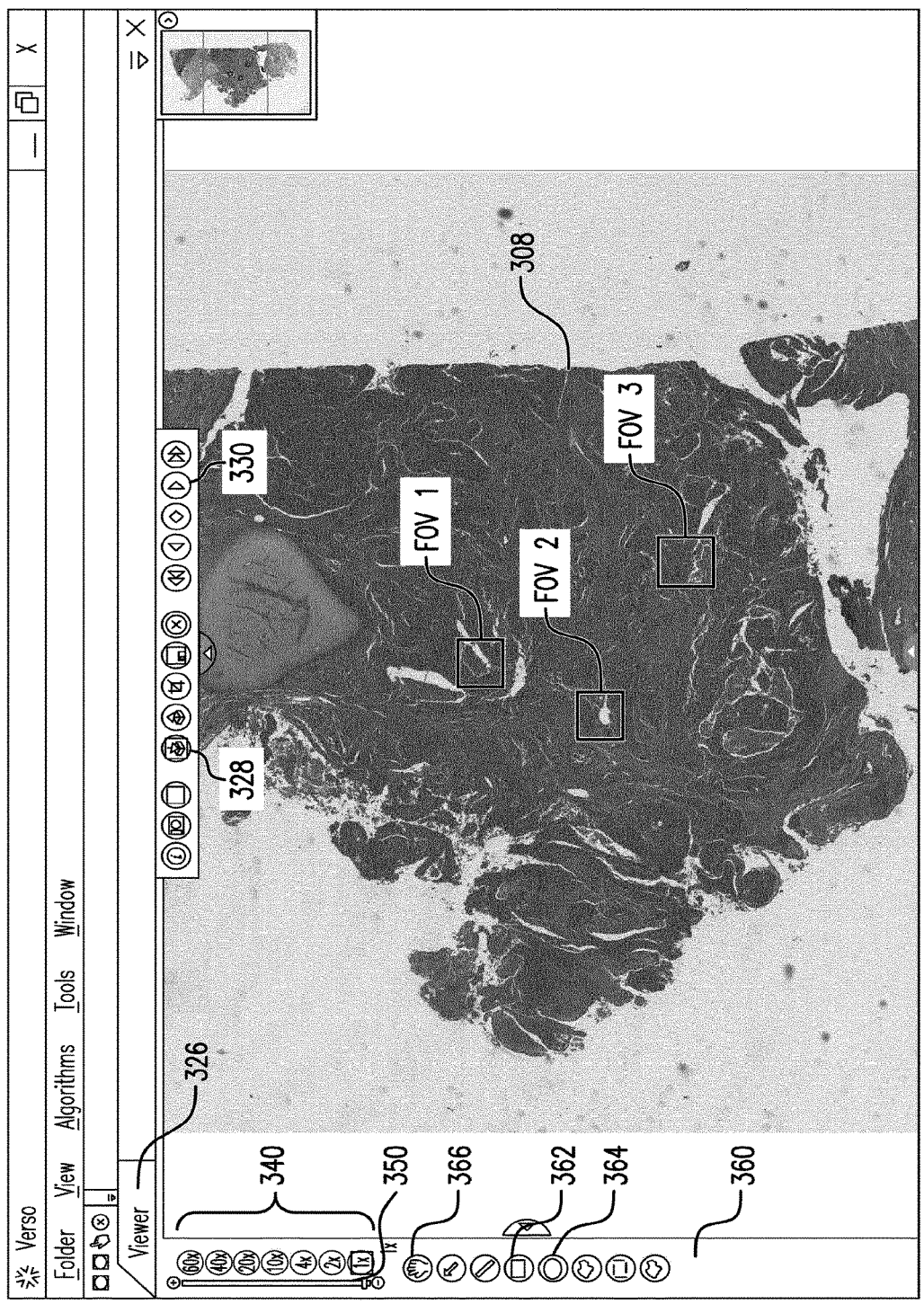
FIG. 7 is another screenshot of the annotation module GUI of FIG. 6 after a digital slide has been annotated.

FIG. 7 illustrate the same HE source image 308, also displayed in the annotation screen, but after it has been annotated using the tools 368 provided in the annotation module (e.g. Verso) and illustrated in the Figure. Specifically, three regions of interest (depicted as rectangles and labeled FOV1, FOV2 and FOV3) have been marked in the HE image 308. For each of these three regions in the HE image 308, the registration module should return the corresponding annotation in the target image (the IHC image 310 in the present example).

Figure 8:
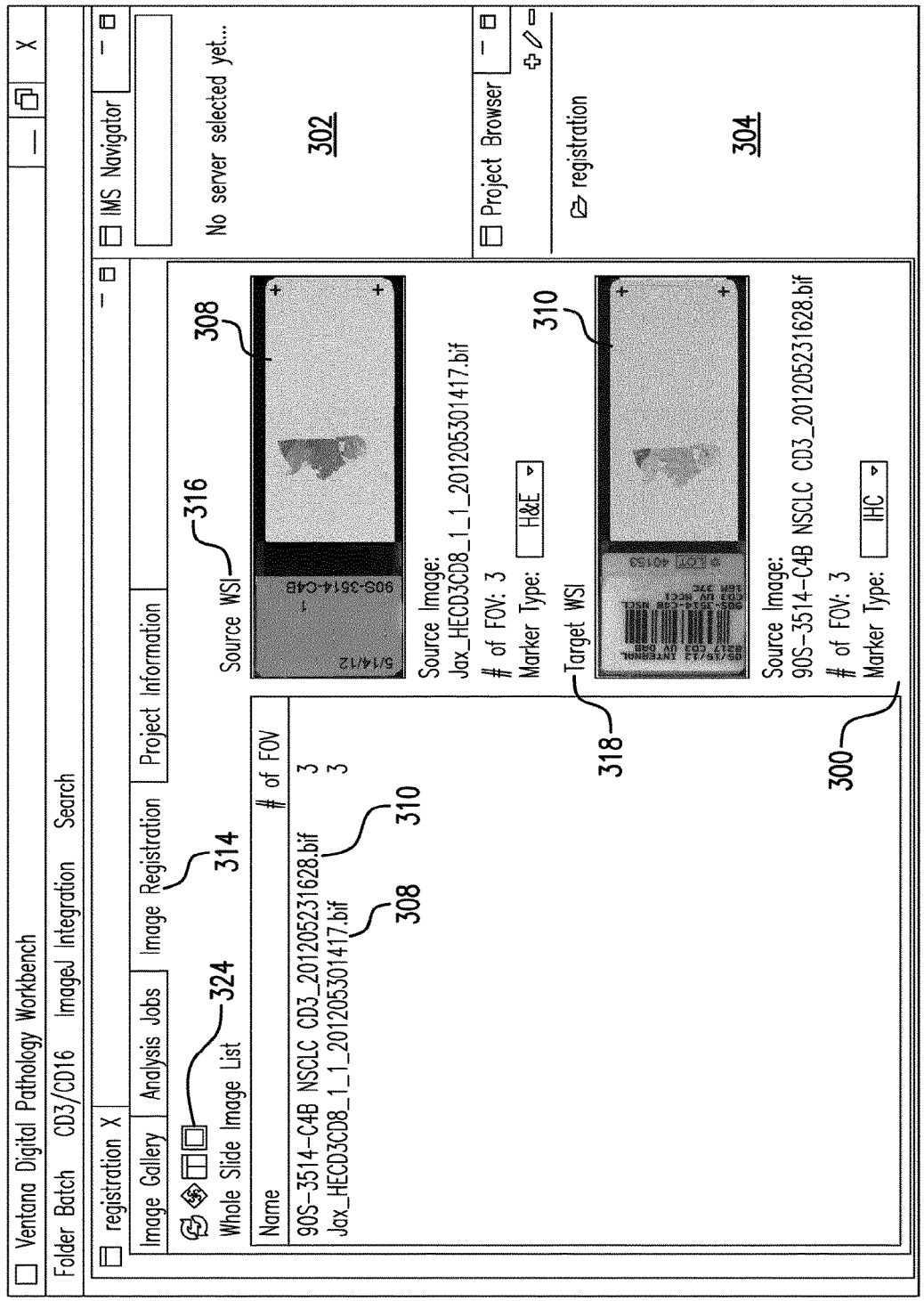
FIG. 8 is another screenshot of screen of FIG. 5 after performing image registration.

FIG. 5 together with FIG. 8, which is another screen shot of the image registration module (e.g. WorkBench) GUI, illustrates how changes in the annotation module (e.g. Verso) are updated to and reflected in the image registration module. Specifically, as shown in FIG. 5, under the image registration tab 314, after annotation in the annotation module, the # of FOV tab 309 is updated to indicate that three different FOV images ("FOV") are available for the HE source image 308. FIG. 8 illustrates updates to the image registration module after the user instructs the program to align the source image (in the example the HE image 308) and the target image (in the example the IHC image 310). Specifically, under the image registration tab 314, after image registration, three different FOVs are now also available for the IHC target image 310.

FIG. 9 is another screen shot of the annotation module (e.g. Verso) GUI. As shown, in the illustrated embodiment, once the image registration is completed through the WorkBench framework, the annotation screen automatically opens up in the annotation module with the HE source image 308 and the IHC target image 310 displayed together on the same screen, for example side-by-side as shown, with matching FOVs (i.e. the user-marked annotations 311a-c are displayed on the HE source image 308 and the corresponding retrieved annotations 311d-f are displayed on the IHC target image 310). In the illustrated embodiment, the whole slide images are shown at 1× resolution so that all 3 FOVs can be seen side-by-side for both whole slide images.

Figure 10:
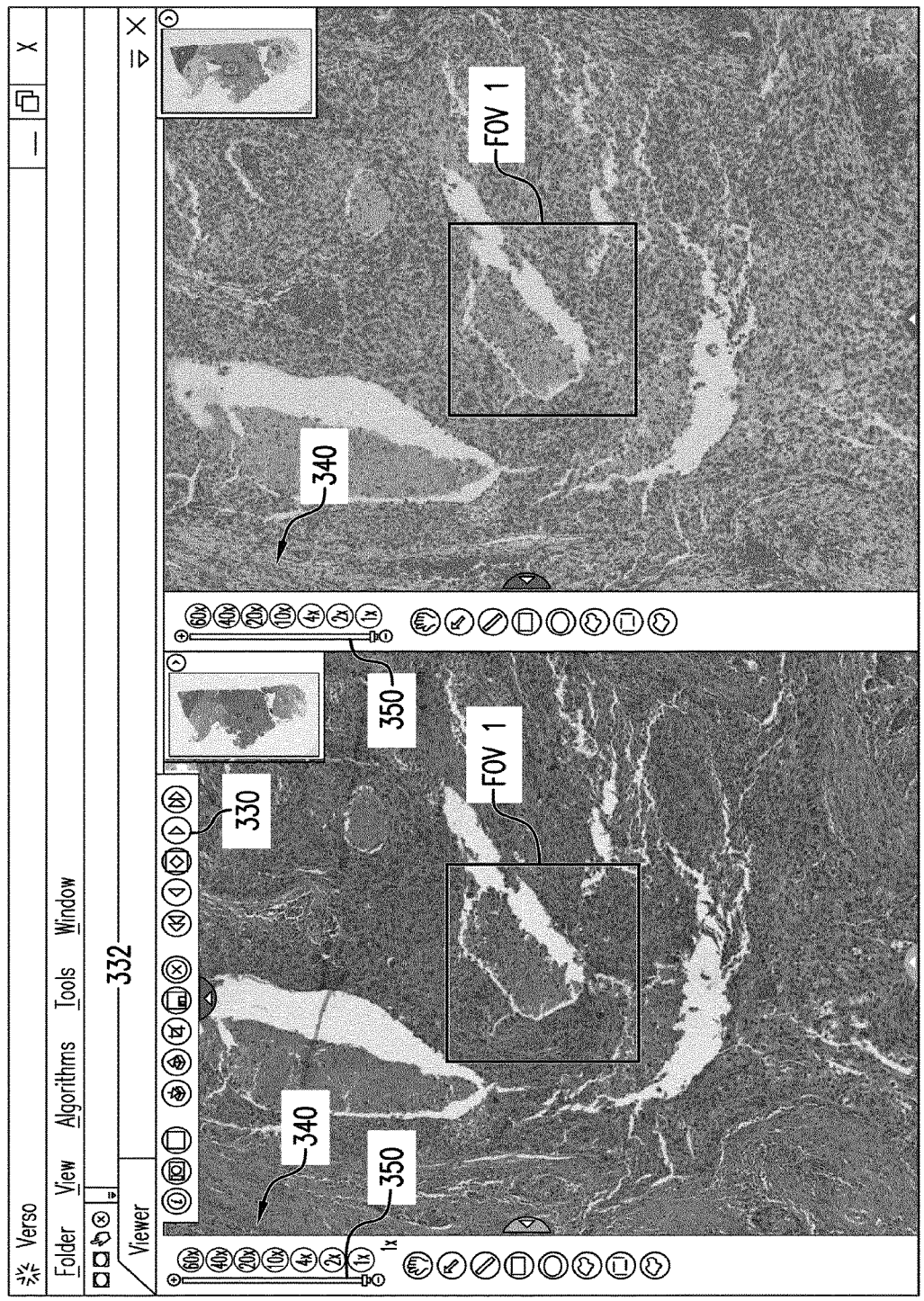
FIG. 10 is another screenshot of the annotation module GUI of FIG. 9, displaying a desired Field of View ("FOV") for a pair of registered images.

As shown in FIG. 10, in the illustrated embodiment, VersoViewer also includes a mode to view the annotated regions, one after the other. Clicking advance button 330 permits a user to progress forward from one annotation to the next, whereas previous button 332 permits a user to move from the currently viewed annotation to the previously viewed annotation. Also in the illustrated embodiment, as as a user progresses from one FOV (for example the first FOV) to another FOV (for example the second FOV) for image 1, the display in right pane similarly progresses through the corresponding FOVs (here from the first FOV to the second FOV) for image 2.

Figure 11:
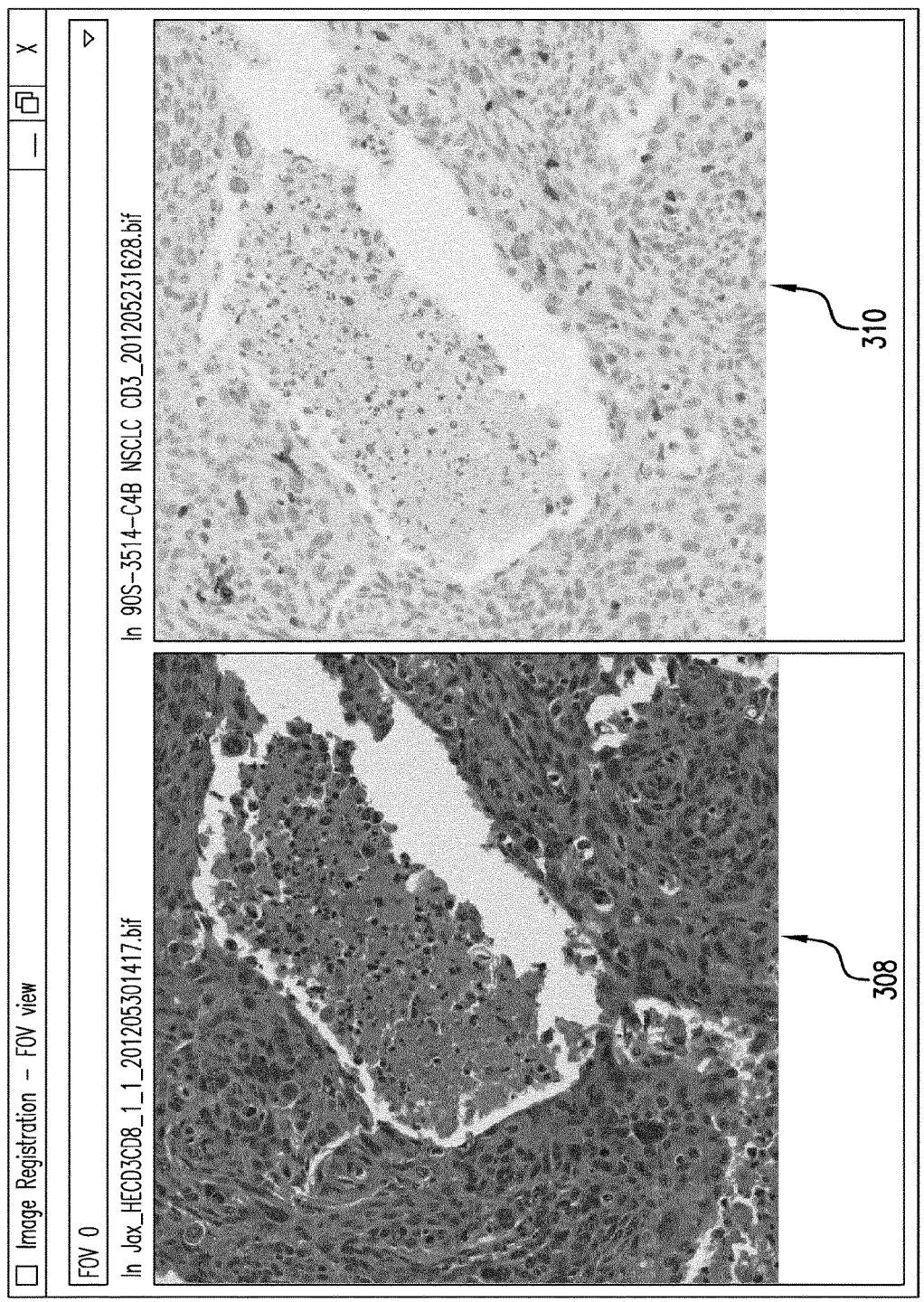
FIG. 11 is a screenshot of a window that is opened when a user selects the display button 310 under the image registration tab of the homescreen shown in FIG. 8.

FIG. 11 is a screen shot illustrating an alternative image display for viewing individual FOVs that is available under the image registration tab 314 of WorkBench. Clicking on the side-by-side image FOV viewing button 324 (FIG. 5) opens up the screen of FIG. 11. Similar to the VersoViewer implementation, the WorkBench view is also a split screen wherein at least a portion of the annotated HE source image 308 is displayed on one part of the screen and the corresponding portion of the annotated IHC target image 310 is displayed on the second part of the screen. FIGS. 10 and 11 depict the first annotation FOV in the annotation module and image registration module respectively, and illustrate how matched annotations can be compared using Verso Viewer as compared to WorkBench. As is apparent from the figures, in the annotation module (VersoViewer), the annotation is displayed in the middle of each split screen in addition to other parts of the slide image. By contrast, in the image registration module (WorkBench), only the annotation portion of the digital image can be seen. In the image registration module, similar to the annotation module, there is an option to run through all the available image pairs. In the example, there are three image pairs, which can be selected for independent viewing by the user. Accordingly, similar split screen views of the second and third annotation may also be launched in the annotation module and/or the registration module, which in the case of the registration module are accessed for example by using up/down arrows to scroll through the pairs of images. Also as illustrated, the annotation module provides the user with flexibility in terms of how to view the results. For example, the user can choose the resolution at which to view the image (4× is illustrated in the screen shot) using the zoom buttons 340 and/or zoom slider 350.

Figure 12:
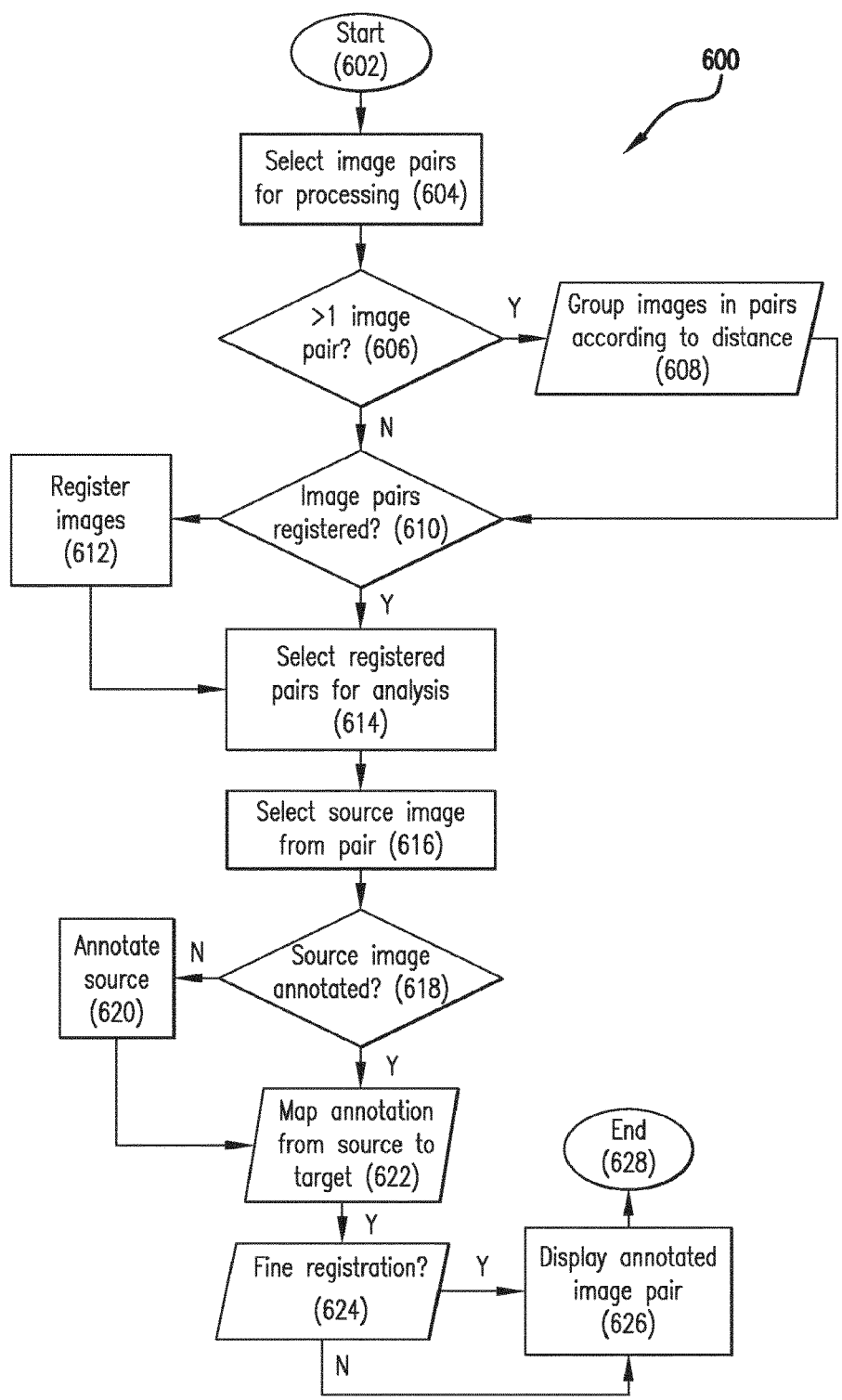
FIG. 12 is a flow diagram illustrating an embodiment of a method carried out by an image analysis software program in accordance with this disclosure.

FIG. 12 is a flow diagram illustrating an implementation of a method carried out by an embodiment of an image analysis software program in accordance with this disclosure. The image analysis software program enables a user to instruct the processor to align selected digital images (e.g. digital images of scanned slides of tissue sections, including whole slide images, partial slide images, or portions of whole or part slide images), annotate one or more of the images, map annotations from one or more images to other images, or combinations thereof. As shown in FIG. 12, the method 600 begins at the start block 602. At block 604, a set of digital images is acquired (e.g. scanned or selected from the database) for manipulation. Each set of digital images includes one or more digital images corresponding to, for example, a tissue section from a set of adjacent tissue sections of a single patient. Each set of digital images includes one or more digital images corresponding to a tissue section from a set of adjacent tissue sections of a single patient. Each image may be derived from tissue sections that are differently stained, or that are digitized using a different imaging mode, or both, as compared to another image. In some embodiments, the digital images are produced by scanning slides (e.g. microscope glass slides) prepared from adjacent tissue sections.

At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (L1 . . . L10), then L1 and L2 are grouped as a pair, L3 and L4 are grouped as a pair, etc. On the other hand, if information is not available as to which pairs of images are most similar to each other then, in some embodiments, images are grouped according to their distance apart, (e.g., inter-edge or inter-image distance corresponding to the chamfer distance between the H maps of the various images), pairing together images which are closest to one another. In exemplary embodiments of the present invention, an inter-edge/inter-image distance is utilized to pair of images. In some embodiments, edge-based Chamfer distance may be used to compute the inter-image/inter-edge distance. If the pairs of images have previously undergone a coarse registration process, such that the images have been coarsely aligned and the results have been saved, the process advances to block 614. Otherwise, at block 612 a coarse registration process is performed on the selected image pairs. The coarse registration process is described in further detail below.

Passing to block 614, the selected, and now registered (aligned), images are displayed on a common grid, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. In some embodiments, the annotation is reproduced on that selected image, for example substantially simultaneously with the user inputting the annotation. In some embodiments, the user first identifies a source and target image, and if the source image has been annotated the user proceeds to instruct the program to register the images (for example undergo a coarse registration process). If the source image has not yet been annotated, the user may annotate the source image prior to registering the pair of images. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images are registered (aligned). Moving to block 624, a fine registration process may be performed to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Figure 13:
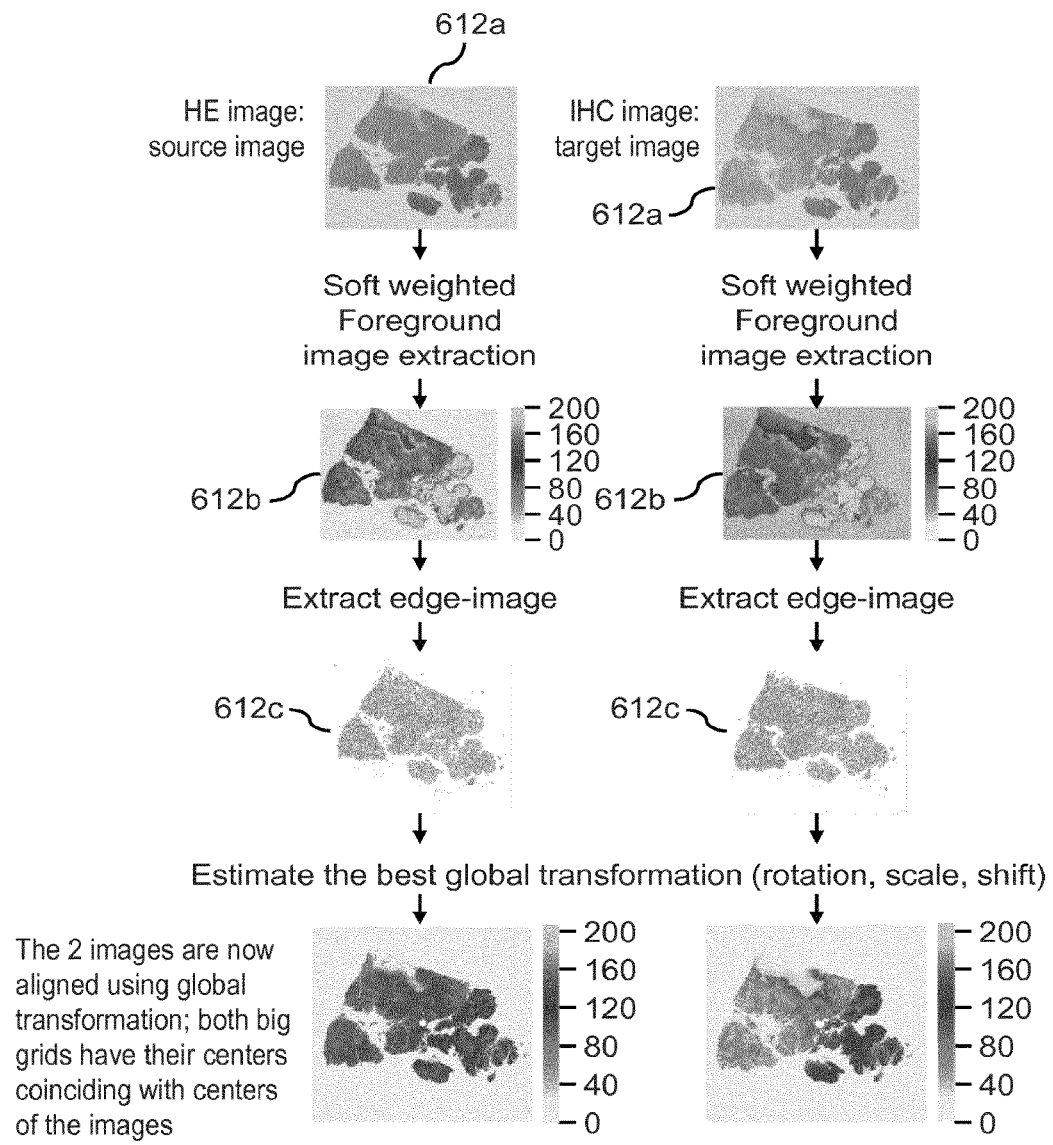
FIG. 13 illustrates the basic steps of an embodiment of a coarse registration process, which may be part of an image analysis program in accordance with this disclosure.

FIG. 13 illustrates further details regarding block 612, the coarse registration process. Prior to initiating the coarse registration process, two images are selected for alignment (block 604, FIG. 12). As shown in FIG. 13, in some embodiments, the coarse registration process, which is applied to the two images, may involve: 1) obtaining a soft weighted (continuous valued) foreground image (also referred to as a 'gray-scale' image herein) from each of the selected images (block 612a, FIG. 13); 2) extracting an edge-image from each of the resultant foreground images (block 612b, FIG. 13); and, 3) computing global transformation parameters (e.g. rotation, scale, shift) (block 612c, FIG. 13) using edge-map based matching and moments information obtained from the soft weighted foreground images. Finally, as shown in FIG. 13, the two images are aligned using the global transformation parameters and may be displayed on a common grid on a monitor (or monitors).

FIGS. 14-18 illustrate further details of block 612a, wherein soft weighted foreground (i.e., images corresponding to a soft weighting applied to the stain images, where higher/lower values denote that a certain stain color is more/less present) are obtained. The soft weighting method is a method for obtaining a continuous-domain valued image from a discrete valued unsigned character image (e.g., wherein the range of the pixel values is 0-255). In some embodiments, the goal of obtaining the soft weighted foreground image is to separate tissue from non-tissue in the digital image and to provide the basis for moment computation from the whole slide, for scaling and translation estimation. In some embodiments, the gray-scale, foreground images are obtained by applying a color de-convolution process to the selected digital images, which may be scans of glass slides prepared from tissue sections which have been stained. The specific color de-convolution process depends on the specific stain, and will be described herein by way of three examples: HE stain, IHC stain and fluorescent image.

Figure 14:
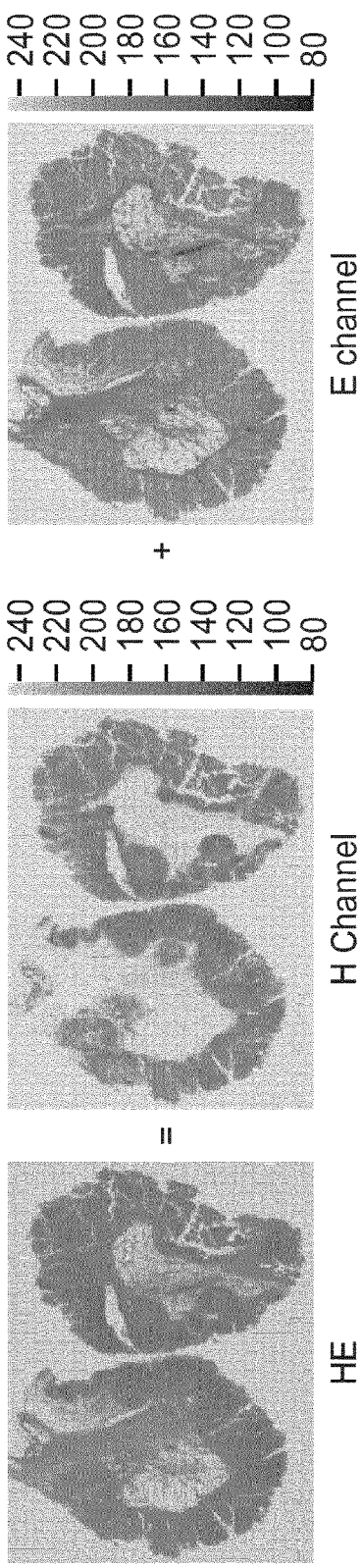
FIG. 14 illustrates further details of one of the basic steps of the embodiment of the coarse registration process of FIG. 13.
Figure 15A:
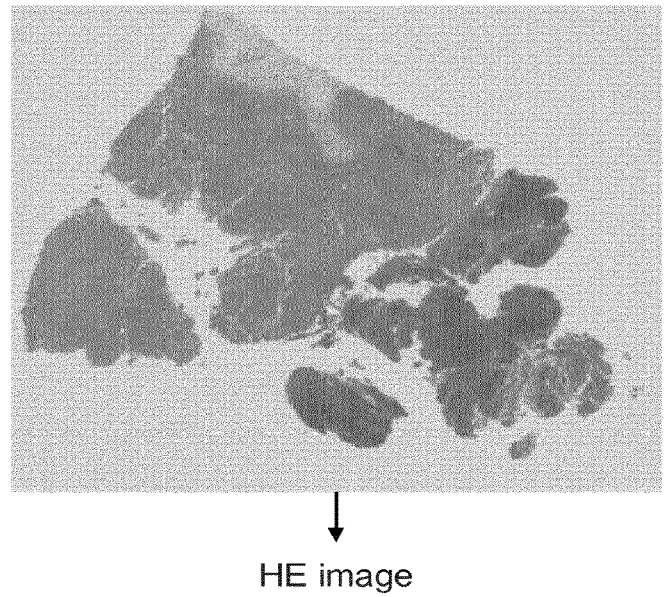
FIG. 15 illustrates a HE image and its corresponding soft weighted foreground image.
Figure 15B:
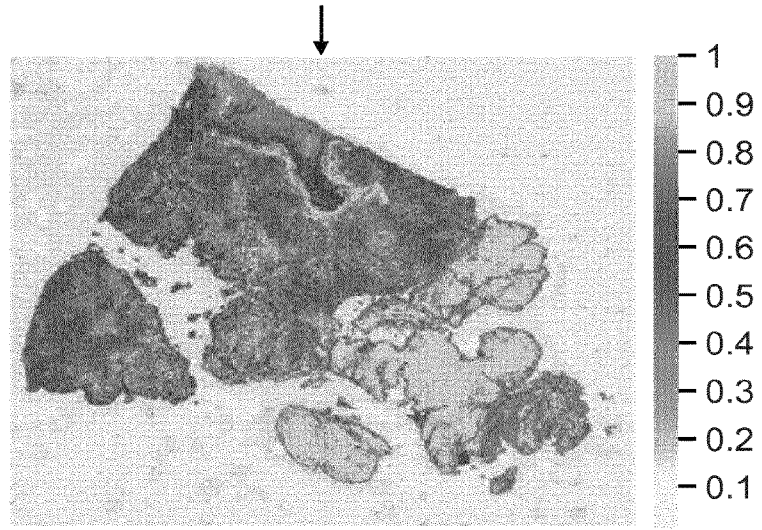
Figure 15C:
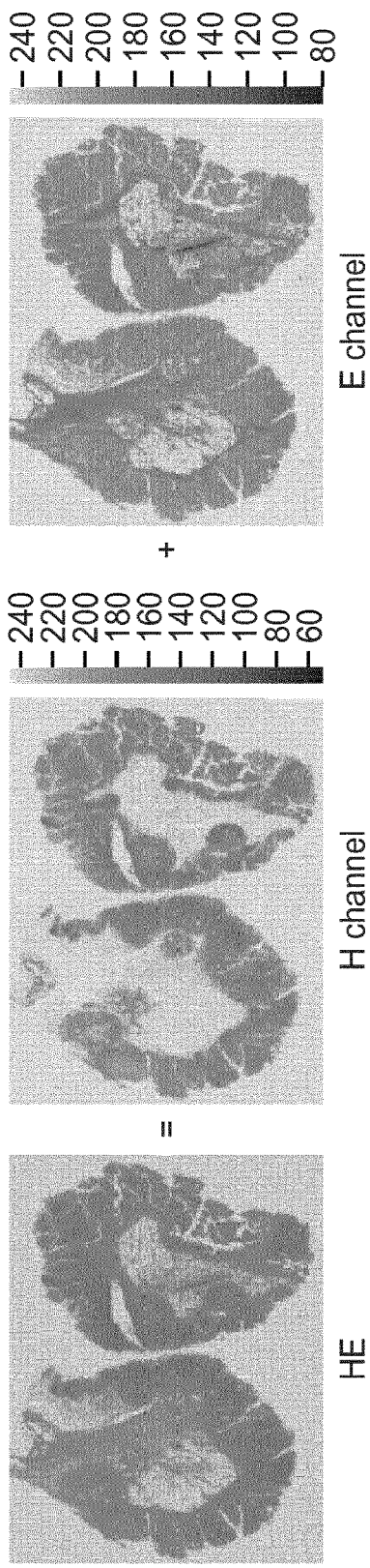
Figure 16:
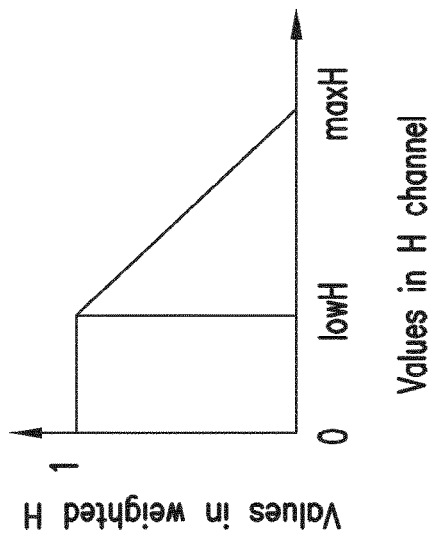
FIG. 16 illustrates an embodiment of the soft weighting process of FIG. 14 for the H channel image of FIG. 15.

FIGS. 14-16 illustrate the soft weighting foreground image extraction process for an HE image. As shown in FIGS. 14-16, the image extraction process is essentially a color de-convolution process, wherein the color stain is removed from the original HE image (FIG. 15a) to result in the soft weighted foreground image (FIG. 15b). The HE color de-convolution can be performed by any method known in the art, for example as described in: Ruifrok A C, Johnston D A, Quantification of histological staining by color deconvolution, *Anal Quant Cytol Histol* 23: 291-299, 2001, which is herein incorporated by reference in its entirety.

FIGS. 14 and 16 together illustrate an embodiment of a process used to obtain the image of FIG. 15b. As shown in FIG. 14, an H channel image and an E channel image are obtained by removing two image components (specifically H (haematoxylin: Blue colored) and E (Eosin: red colored)) which have been mixed/added to form the composite image HE image of FIG. 15a. In some embodiments, after the two (H and E) channels are obtained (e.g. after the color de-convolution process), an OTSU and soft weighting method are performed on each of the H channel image and E channel image. The OTSU method is a thresholding method used to automatically perform histogram shape-based thresholding and is described, for example, in Otsu, Nobuyuki, "A Threshold Selection Method From Gray-Level Histograms" *Automatica* 11.285-296 (1975): 23-27, which is herein incorporated by reference in its entirety. The weighted H image (e.g., a image that reflects the stain contribution of the H channel, where the weighted H image has higher/lower values when the stain contribution of the H channel is higher/lower) is obtained after OTSU-based thresholding and soft weighting on the H-channel image. Similarly, the weighted E image is obtained after OTSU-based thresholding and soft weighting on the E-channel image. Finally, the weighted HE image is obtained as follows: each pixel in the weighted HE image=maximum of (H channel image pixel, E channel image pixel), i.e. it is the maximum of the corresponding pixel values in H and E channel images.

FIG. 16 illustrates an embodiment of the soft weighting process for the H channel image. After OTSU-based thresholding is performed, the threshold value (to separate the foreground from the background H channel) is taken as levelH. Accordingly, levelH is the OTSU-based threshold computed on the H channel, lowH is the value of fraction*levelH, and maxH is max(H channel image), i.e. the maximum value of all the pixels in the H channel image. As may be understood from this description, in H and E channels, lower (or higher) intensity values correspond to darker (or lighter) regions in the image; e.g., in the H channel, darker regions denote areas where haematoxylin (blue component) is more strongly expressed. In the final weighted H image, a high value for these darker regions (more blue regions) is expected. Similarly, in the weighted H image, a low value for lighter regions, where the contribution of the haematoxylin is low, is expected.

In some embodiments, the objective is to obtain a weighted H image that is higher in value when the contribution of the blue haematoxylin channel is high, and lower in value when the blue channel contribution is low. In FIG. 16, the fraction term controls how the soft weights are assigned to weighted H image; e.g. when fraction=1, then lowH=levelH, where image pixels where the blue channel contribution (value of H channel) is less than lowH get assigned a value of 1. When the fraction is 1, the weighted H image has non-zero pixel intensity values in the range [levelH, maxH] (where level H represents the OTSU-based threshold computed on the H channel and maxH represents the maximum value of the H channel image). In some such embodiments, for pixel/pixel intensity values in the H channel which are lower than levelH, the weighted H image is assigned a value of 1. For values in the H channel which lie in the range [lowH, maxH], the weighted H values are in the range [1,0]. A range of [lowH, maxH] in the H channel is mapped to a range of [1,0] in the weighted H image. In some embodiments, the fraction is an empirically-chosen value of 0.8. Accordingly, the weighted H image will have values in a wider range of pixel values; often, in fainter image regions, the threshold returned by OTSU may not be accurate and hence, lower values are assigned to the weighted image for image pixels with values slightly higher than the OTSU threshold.

Figure 17A:
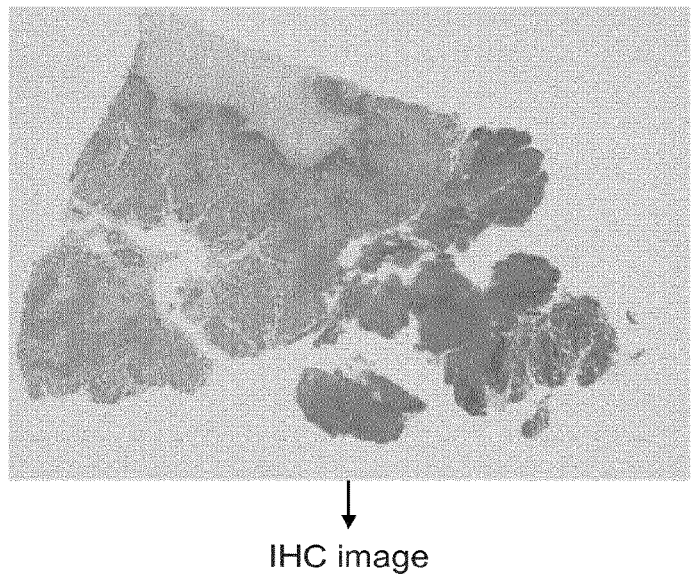
FIGS. 17a-c illustrate an IHC image and its corresponding soft weighted foreground image, as well as details of one of the basic steps of the embodiment of the coarse registration process of FIG. 13.
Figure 17B:
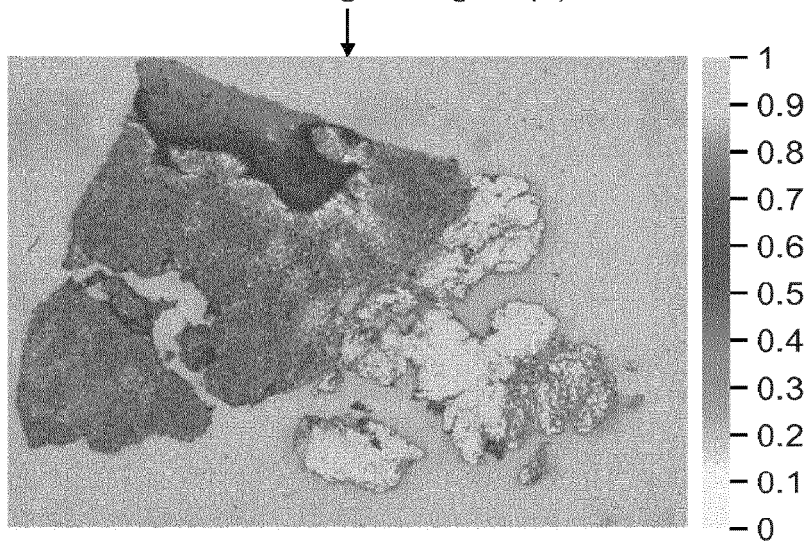
Figure 17C:
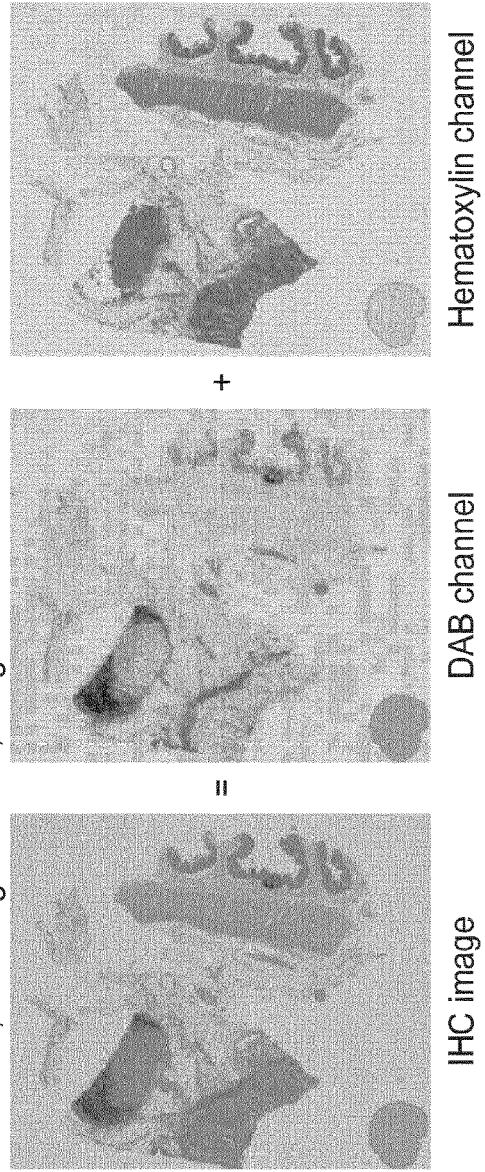
Figure 18:
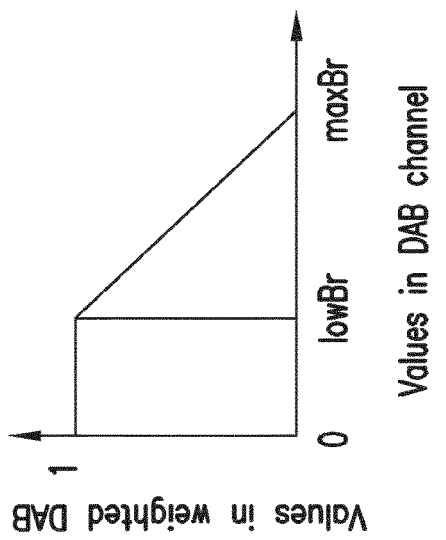
FIG. 18 illustrates an embodiment of the soft weighting process of FIG. 14 for the IHC images of FIGS. 17a-c.

FIGS. 17 and 18 together illustrate the soft weighting foreground image extraction process for an IHC image. As shown in FIG. 17c, the image extraction process is essentially a color de-convolution process, wherein the main color components are extracted from the image. For example, in the illustrated embodiment, hematoxylin (blue) and DAB (brown) are the main stain components, and color deconvolution is used to separate the IHC image into these two color channels.

The same soft weighting method, as used for HE images, is now used for the IHC image. The weighted DAB image is obtained after OTSU-based thresholding and soft weighting on the DAB channel image. Similarly, the weighted Hematoxylin image is obtained after OTSU-based thresholding and soft weighting on the Hematoxylin image. Finally, the weighted IHC image is the max(weighted DAB image, weighted Hematoxylin image), per pixel; i.e. each pixel in the weighted IHC image is the maximum of the two corresponding pixels in DAB and Hematoxylin channel images FIG. 18 illustrates an embodiment of the soft weighting process for the DAB channel image. After OTSU-based thresholding is performed, the threshold value (to separate the foreground from the background in DAB (brown) channel) is taken as levelBr. Accordingly, levelBr is the OTSU-based threshold computed on the Brown channel, lowBr is the fraction*levelBr (here, the fraction is 0.8), and maxBr is max(brown channel image); i.e. maxBr is the maximum of all the pixel values in the brown channel image. For values in the Brown channel which are lower than lowBr, the weighted DAB image is assigned a value of 1. A range of [lowBr, maxBr] in the Brown channel is mapped to a range of [1,0] in the weighted DAB image. As may be understood from this description, in brown and blue channels, lower (or higher) intensity values correspond to darker (or lighter) regions in the image. The overall process results in generating a soft weighted foreground image as shown in FIG. 17c from the original IHC image as shown in FIG. 17a.

A soft weighted foreground image can also be extracted from a fluorescent image, for example by preparing a grayscale image and applying OTSU to transform the grayscale image to a binary image. In some embodiments, as the starting point for extracting the soft weighted foreground image, a grayscale thumbnail image is read off from the fluorescent image. Then, OTSU is used to transform the grayscale thumbnail image to a binary image. And then, connected components is performed on the binary image, for example as described in Samet, Hanan, "An Improved Approach to Connected Component Labeling of Images," *Proceedings,* IEEE Computer Society Press, 1986, which is herein incorporated by reference in its entirety. In some embodiments, the connected components analysis is used to return contiguous regions in the binary image using standard algorithms. Out of the contiguous regions returned after connected components, some of the outlier regions are discarded based on predetermined criteria such as smaller cell sizes. The result of the process is to have foreground regions in the thumbnail image, where each region exceeds a certain minimum size. In some embodiments, if N is the total number of ON pixels in the foreground image, the minimum size expected from a single blob obtained from a connected component should be at least N/20—the choice of minimum area, wherein N/20 is empirically chosen. For these regions, a higher value is assigned for the soft weighted foreground image where the thumbnail image is darker (wherein the darker (or lower) intensity value regions are more likely to be tissue regions, and the lighter (or higher) intensity value regions are more likely to be non-tissue, glass regions).

Figures 19A, 19B:
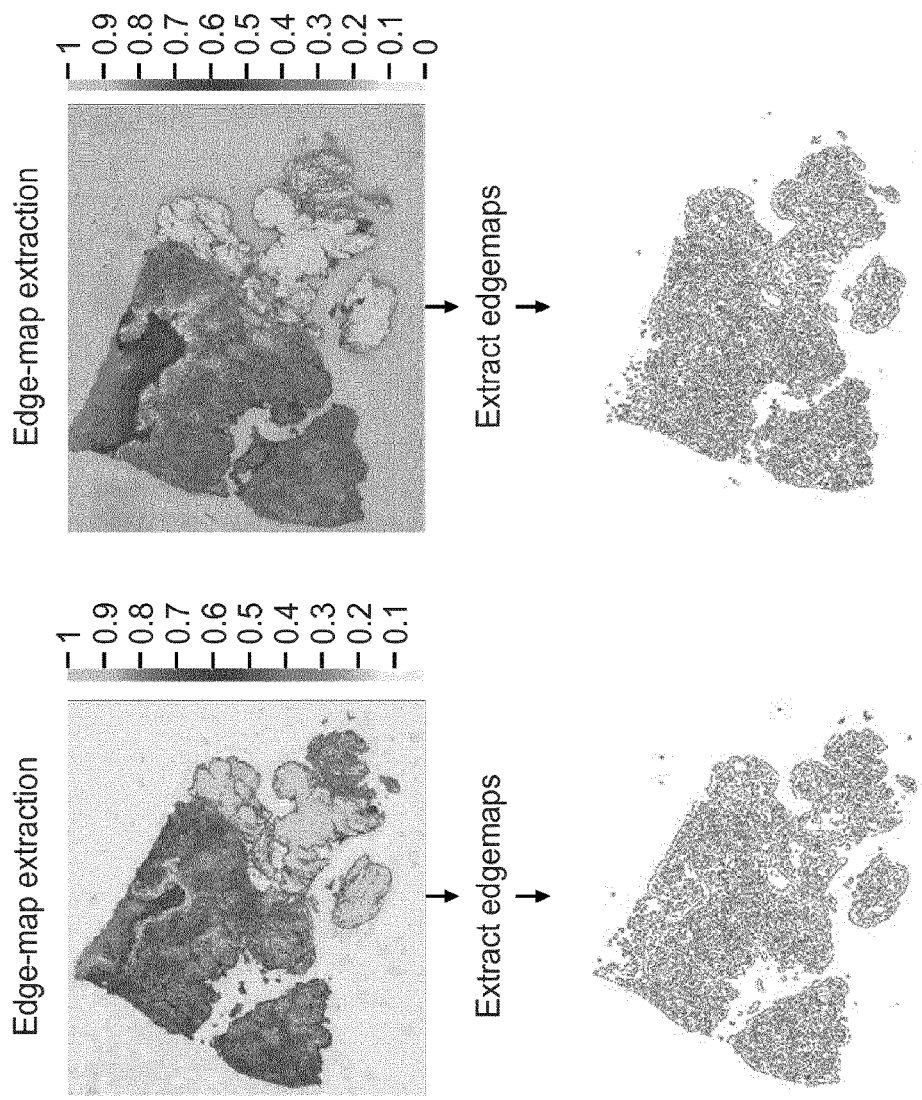
FIG. 19 illustrates a soft weighted foreground HE image and its corresponding edge-map, as well as a soft weighted foreground IHC image and its corresponding edge-map.

After the soft weighted foreground image is extracted, global transformation parameters are estimated (block 612c, FIG. 13). In some embodiments, a first image (for example, the source image where the user/pathologist has marked certain regions) and a second image (for example a target image which the user/pathologist has selected for retrieving the marked regions) are compared to compute the global transformation. As shown in FIG. 19, in some embodiments, the comparison is done by edge-map detection (block 612b, FIG. 13). FIG. 19a illustrates an edge-map extraction for an HE image, with the top half of the figure illustrating the weighted foreground image and the bottom half illustrating the edge-map for the HE image. FIG. 19b illustrates an edge-map extraction for an IHC image, with the top half of the figure illustrating the weighted foreground image for the IHC image and the bottom half of the figure illustrating the edge-map for the IHC image.

In some embodiments, the edge-map is extracted using the Canny edge detection mode, for example as described in Canny, John, "A Computational Approach to Edge Detection," *Pattern Analysis and Machine Intelligence,* IEEE Transactions at 6 (1986); 679-698, which is herein incorporated by reference in its entirety. As a first, step, a gradient image is computed for the soft weighted foreground image which is then used for edge detection. The edge maps are then used to determine the global transformation between the two images. In some embodiments, the parameters of the global transformation that assists in mapping image 1 to image 2 are: 1) translation along the x and y axes; 2) scaling for x and y axes; 3) rotation angle; and, 4) reflection, which can be along the x axis, the y axis, or both. Based on the soft weighted foreground images, the centroid images for each image is computed; their difference gives the translation along the x and y axes, used to align the first image with the second image. Using the moments (for example as described at Hu, Ming-Kuei, "Visual Pattern Recognition by Moment Invariants," *Information Theory,* IRE Transactions, vol IT-8, pp. 179-187, 1962, which is herein incorporated by reference in its entirety) for the soft weighted foreground images, the scale factors for the x and y axes are computed, which may align the first image with the second image. Once the soft weighted foreground images are computed, OTSU-based thresholding is performed to obtain mask images (binary images) from the stained images. Based on the mask images in the first and second image, the principal angles in both domains are computed using Hu moments; the angle difference between provides the rotation, for example as described in: Hu, Ming-Kuei, "Visual Pattern Recognition by Moment Invariants," *Information Theory,* IRE Transactions, vol IT-8, pp. 179-187, 1962, which is herein incorporated by reference in its entirety. The angle difference between images 1 and 2 is considered as a likely value of the transformation angle which can map image 1 to image 2

(angle φ=(principle angle from image 2)−(principal angle from image 1)), where the principal angles are computed using the method of moments as described in the above mentioned publication.

Figure 20:
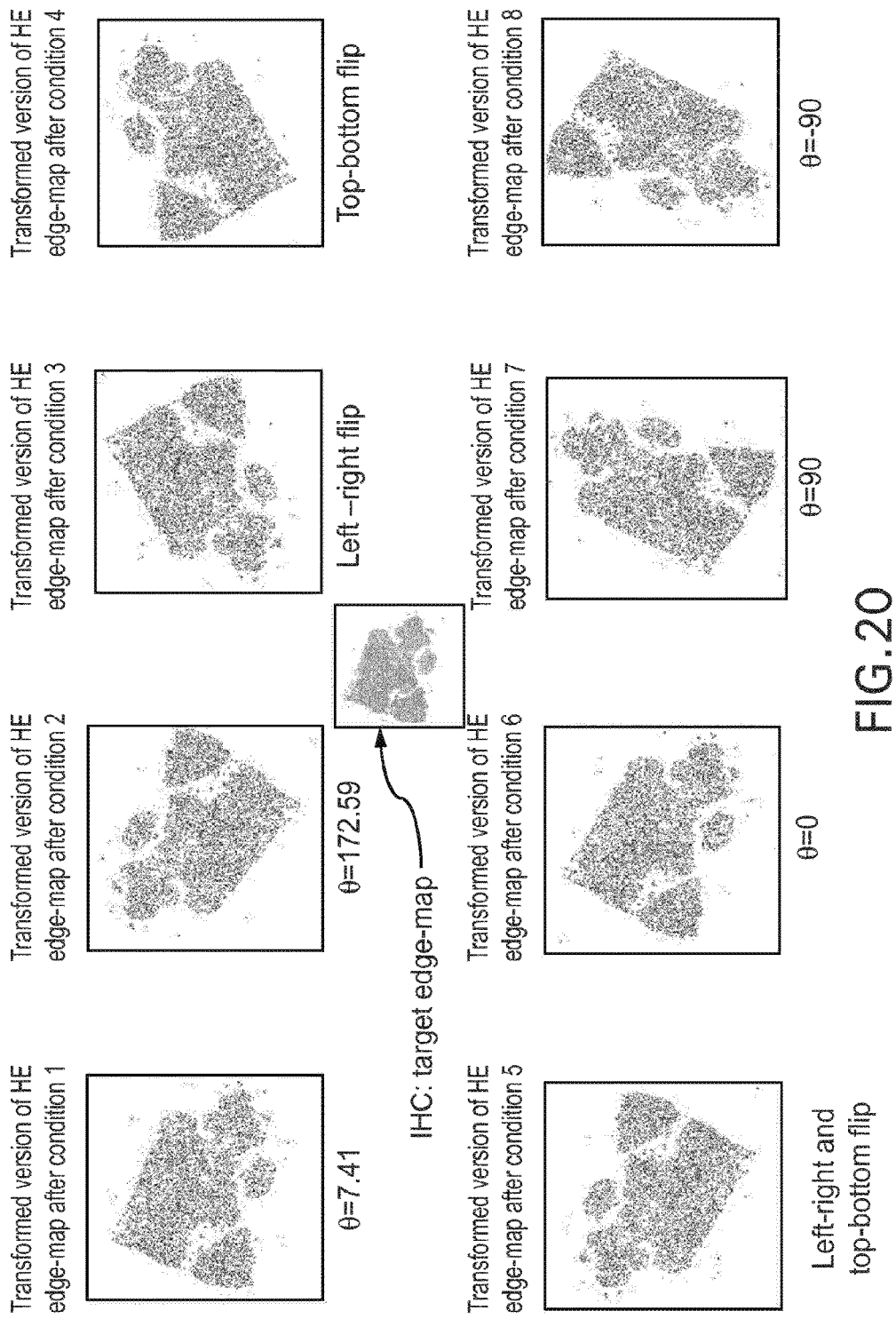
FIG. 20 illustrates a transformed HE edge-map.

In addition, in some embodiments, eight possible transformation cases are considered (each transformation case corresponds to a certain affine global transform being applied on the source image, image 1), and for each case: a) the transformed edge-map for image 1 is computed; as well as b) its distance from the edge-map of image 2. In some embodiments, the transformed edge-map (a) is based on the best transformation case, which in some embodiments is the one which produces minimum distance between the transformed edge map for image 1 and the edge-map for image 2. The eight possible transformation cases may be: 1) rotate by φ; 2) rotate by (180−φ); 3) reflect along x axis; 4) reflect along y axis; 5) reflect along both x and y axes; 6) rotate by 0; 7) rotate by 90; and, 8) rotate by −90 (scaling and translation included for all cases). FIG. 20 illustrates a HE edge-map after it has been transformed according to each of the above eight conditions.

In some embodiments, to obtain the global transformation which coarsely maps image 1 to image 2, the distance between edge maps is computed using a Chamfer distance method (for example as described in Borgefors, Gunilla, "Distance Transformations In Digital Images, Computer Vision, Graphics, and Image Processing, 34.3 (1986): 344-371, which is herein incorporated by reference in its entirety) is used. The Chamfer distance (edge-map A, edge-map B) (corresponding to each image; edge map A is obtained from the source image, image 1, while edge map B is obtained from the target image, image 2) is the average distance between every ON edge pixel in A to the nearest ON edge pixel in B. In some embodiments, the Chamfer distance may be computed as follows:

Let EA denote the edge-map A, a binary image, and DA be the matrix obtained after distance transformation. Each pixel in DA denotes the distance of that pixel in EA to the nearest ON pixel in EA.

$$e.g.\ if EA = \begin{bmatrix} 1 & 0 & 0 & 1 & 1 \\ 0 & 1 & 1 & 1 & 0 \\ 1 & 0 & 0 & 1 & 0 \\ 0 & 0 & 0 & 0 & 1 \\ 0 & 1 & 0 & 0 & 1 \end{bmatrix}$$

and $$DA = \begin{bmatrix} 0 & 1.0000 & 1.0000 & 0 & 0 \\ 1.0000 & 0 & 0 & 0 & 1.0000 \\ 0 & 1.0000 & 1.0000 & 0 & 1.0000 \\ 1.0000 & 1.0000 & 1.4142 & 1.0000 & 0 \\ 1.0000 & 0 & 1.0000 & 1.0000 & 0 \end{bmatrix}$$

e.g. in EA, consider the pixel in the $4^{th}$ row and $3^{rd}$ column. The two pixels, which are valued 1, and which are nearest to it are in the $3^{rd}$ row $4^{th}$ column, and in the $5^{th}$ row $2^{nd}$ column. If the location of a pixel is denoted as (i,j), it indicates that the pixel resides in the $i^{th}$ row and $j^{th}$ column of the matrix EA. So, if there are 2 pixels with locations given by $(i_1, j^1)$ and $(i_2, j_2)$, then the $L_2$ distance between the 2 pixels is given by sqrt($(i_1-i_2)^2+(j_1-j_2)^2$)). Hence, the distance of the two pixels nearest to it are sqrt(2) and sqrt(2) respectively and the value of the $4^{th}$ row and $3^{rd}$ column in DA is min(sqrt(2), sqrt(2))=sqrt(2).

Chamfer Distance (edge-map of A, edge-map of B)= (EA.*DB)/(number of 1's in EA), where DB is the distance transformation of edge-map B.

(EA.*DB)=(multiply each element in EA with every corresponding element in DB) and (then sum up the numbers)

As a person of skill should understand, Chamfer Distance is not a distance metric due to its non-commutative nature. More specifically, Chamfer distance is a distance function which can be used to explain the similarity/dissimilarity between two edge-maps. The distance function can be used to compare shapes if shapes are represented by edge-maps. As applied to some embodiments according to this disclosure, Chamfer Distance mainly compares tissue regions between images; the two tissue regions are similar when their edge-maps are similar, which can be well captured by the Chamfer distance. There can be differences in color and stain intensity between the images but the edge-map is a relatively more consistent feature as it captures the structure of the tissue. When same/parallel tissue slices are compared, the structure remains more or less the same. For a distance function to be a metric, when we the distance from edge-map A to edge-map B is obtained, the distance should be the same even if obtained from edge-map B to edge-map A. For Chamfer distance, this commutative property does not hold and so it is not a metric. Consequently, in some embodiments the maximum of 2 distance values–Chamfer distance from A to B, and Chamfer distance from B to A, is used to obtain the final effective distance between the 2 edge-maps. In short, Chamfer Distance (edge-map A, edge-map B) need not be equal to Chamfer Distance (edge-map B, edge-map A). Thus, in some embodiments, the final distance measure used between edge-maps A and B is: max(Chamfer Distance (edge-map A, edge-map B), Chamfer Distance (edge-map B, edge-map A)). And, in some embodiments, once these distance values are computed for all eight conditions, the condition resulting in the lowest distance value is selected.

Figure 21:
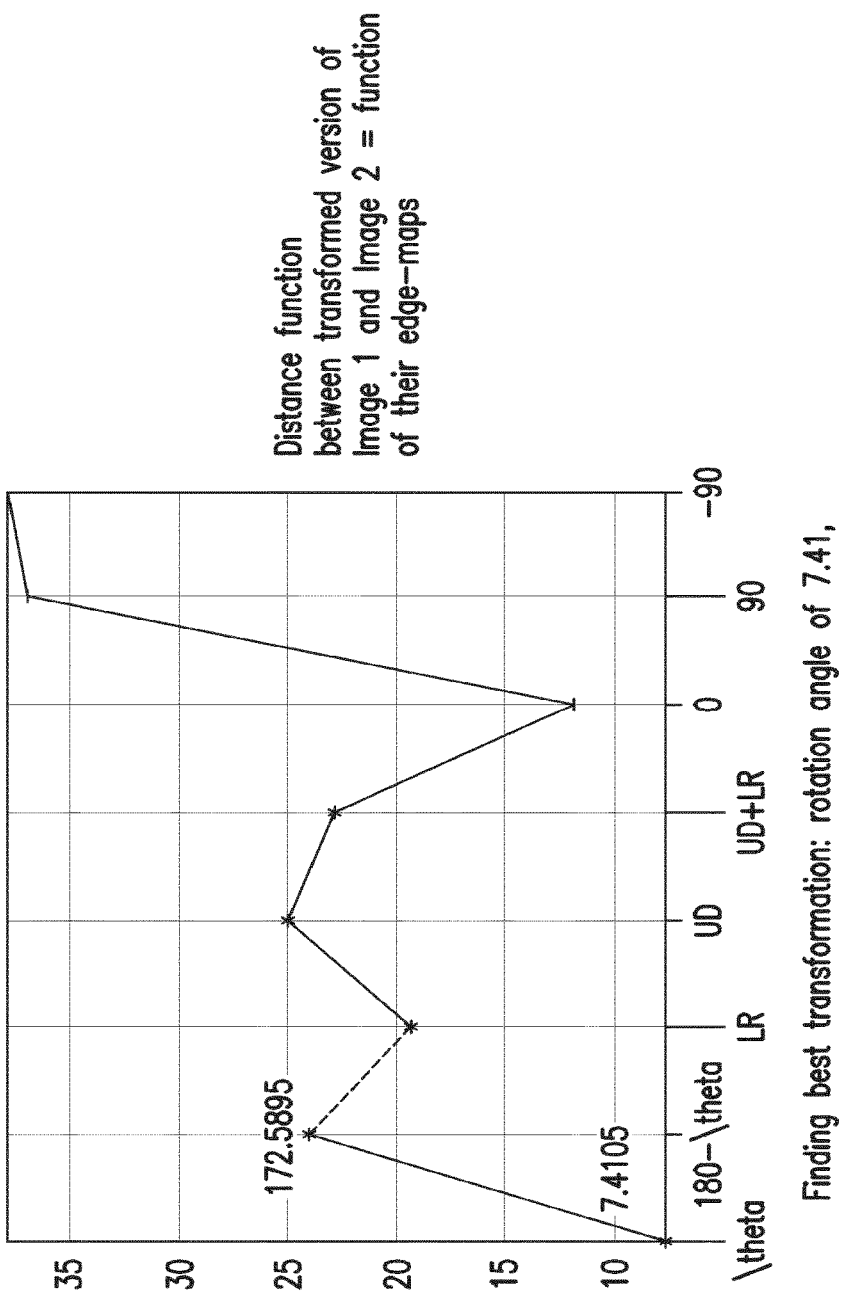
FIG. 21 is an example of a graph of Chamfer distance values in relation to each of eight transformation conditions.

FIG. 21 is an example of the eight computed distance values (the distance function used between transformed versions of the first image and the second image is the function of their edge-maps based on the Chamfer distance). In accordance with that example, the best transformation is found to be that using a rotation angle of 7.41—the $1^{st}$ transformation condition is selected as it results in the minimum Chamfer distance.

Figure 22A:
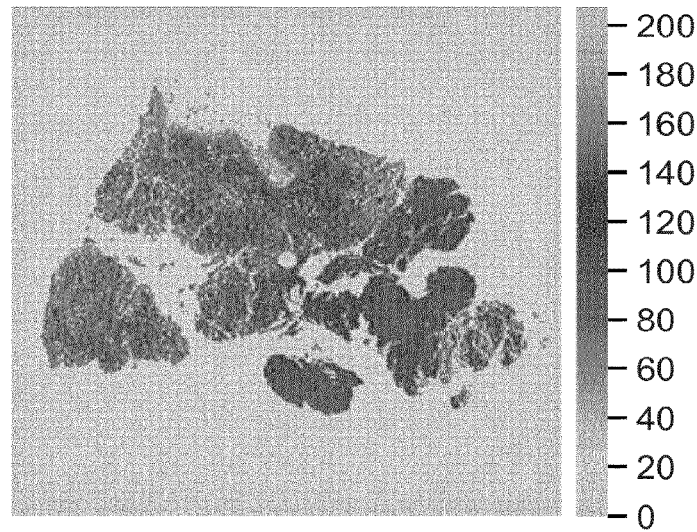
FIG. 22 illustrates a HE image and an IHC image that have been aligned on a common grid using global transformation parameters which have been computed in accordance with an embodiment of this disclosure.
Figure 22B:
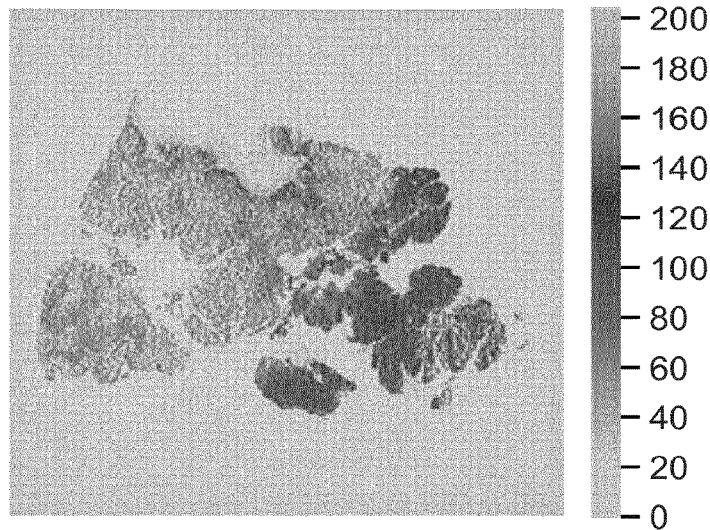

FIG. 22 illustrates an embodiment of block 612 of FIG. 12, wherein registered images are displayed on a common grid after the global transformation parameters are computed (block 612c, FIG. 13). More specifically, in the embodiment, FIG. 22 illustrates a HE and IHC image mapped on a common big image grid, for which in FIG. 22a, the center of the grid coincides with the moment-based center, of the soft weighted foreground HE image common grid, and for which in FIG. 22b, the center of the grid coincides with the moment-based center of the soft weighted foreground IHC image. The common grid, which contains both the transformed versions of the first (e.g. source) and second (e.g. target) images, may be useful to recover any region in the second image, based on a marked region in the first image.

Figure 23:
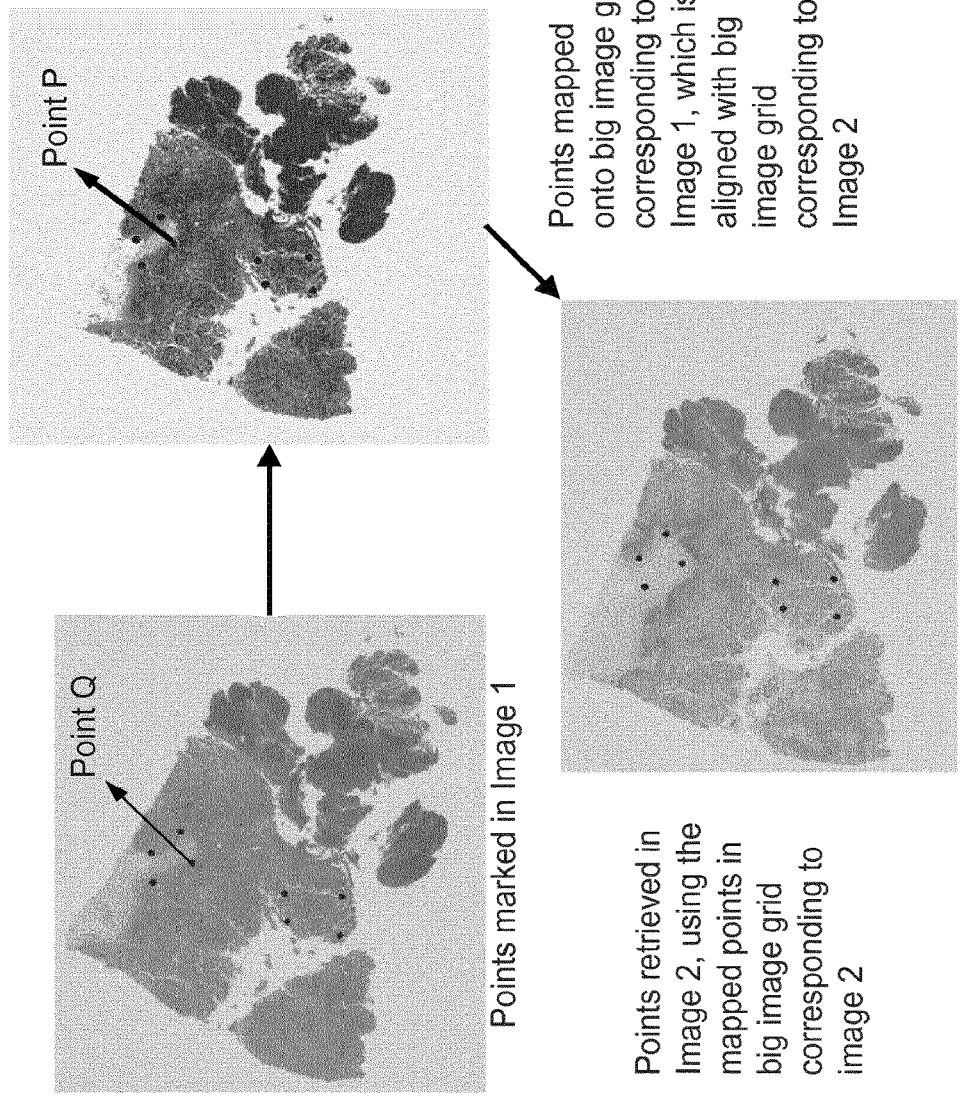
FIG. 23 illustrates the results of mapping an annotation from a first image to a second image only after a coarse registration process according to this disclosure.

Cross-image annotation (blocks 620, 622 FIG. 12) may occur when this big, common grid is obtained which contains both images. For example, in some embodiments, as shown in FIG. 23, a user marked point (in the first image) may be mapped first to the matching region in the big grid, and then a point in the big grid is mapped to the corresponding location in the second image. Consequently, in the described embodiment, the first image is an image in which the pathologist has marked some regions. Cross-image annotation is effectuated by using the best transformation obtained out of eight conditions (rotation angle 7.41 in the example) to arrive at a big, common image grid, which in the example contains the soft weighted foreground image at its center. The process of arriving at a big, common grid can be described more specifically, for example as follows:

Let the source image 1 be an image with M1 rows and N1 columns, and let the location of its centroid be (x1, y1). Then the distance of the centroid from leftmost and rightmost points of image 1 is (x1−0) and (N1−1−x1). Similarly, the distance of the centroid from the topmost and bottommost points in image 1 is (y1−0) and (M1−1−y1). For the target image, image 2, let its size be M2 rows and N2 columns. Let the location of its centroid be (x2, y2). Then, the distance of the centroid from the leftmost and rightmost points of image 2 are (x2−0) and (N2−1−x2). Similarly, the distance of the centroid from the topmost and bottommost points of image 2 are (y2−0) and (M2−1−y2). The images 1 and 2 are placed on the common big grid such that the center of the big common grid coincides with the center of both image 1 and image 2. Therefore, the maximum distance of the centroid in the big, common image grid to any of its boundary points (leftmost, rightmost, topmost or bottommost) is max of these 8 terms {(x1−0), (N1−1−x1), (y1−0), (M1−1−y1), (x2−0), (N2−1−x2), (y2−0), (M2−1−y2)}. Let this maximum distance term be denoted by d. Then the size of the big, common image grid=2*d+1, per side. This grid is a square grid and hence it has 2*d+1 rows and 2*d+1 columns.

As can been seen in FIG. 23, there may be a slight mismatch between the user marked points marked in the first image and the points recovered in the second image. In such a case, a fine registration module (block 624, FIG. 12) may be implemented to further refine the annotation location. In general, in some embodiments, the fine registration process involves defining a first window around the user marked region in the first image, defining a second window in the second image, wherein the second window is larger than the first window but is substantially co-located with the first window on the common grid; and, computing an optimized location for the first window in the second window. In some embodiments, the location of the first window in the second window is optimized by iteratively shifting a window equal, or substantially equal, in size to the first window within the second window to identify a best match. An embodiment of the described fine registration process is provided by way of example below and with reference to FIGS. 24 and 25.

Figure 24:
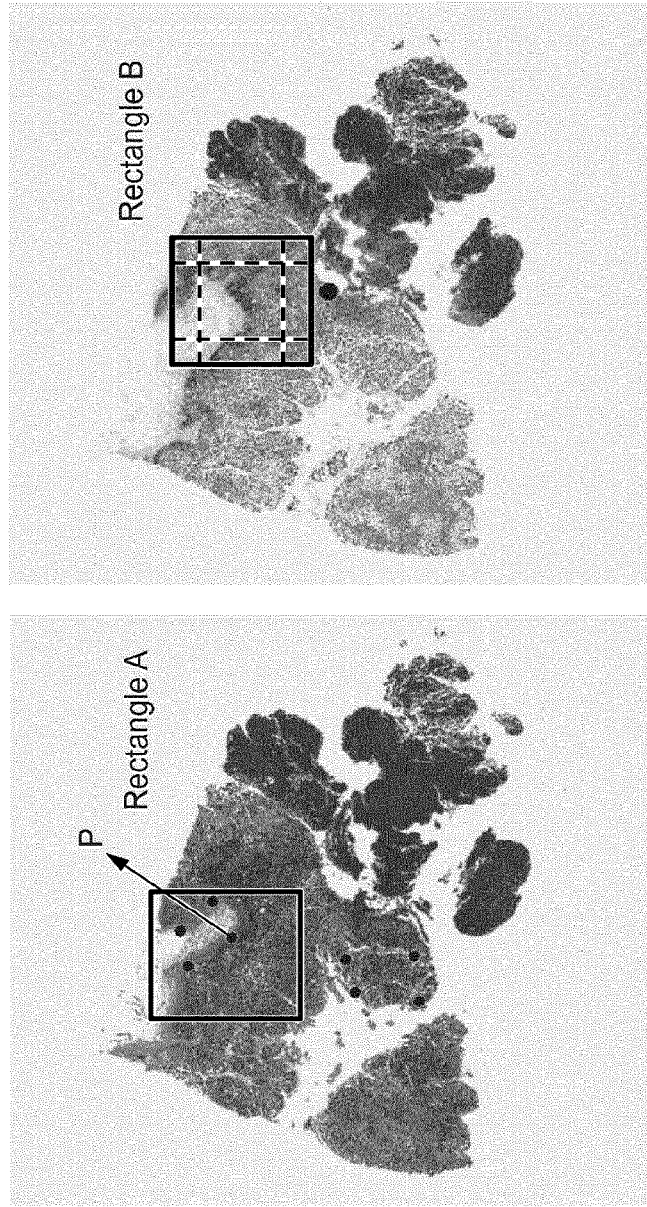
FIG. 24 illustrates an initial step of an embodiment of a fine registration process in accordance with this disclosure.
Figure 25:
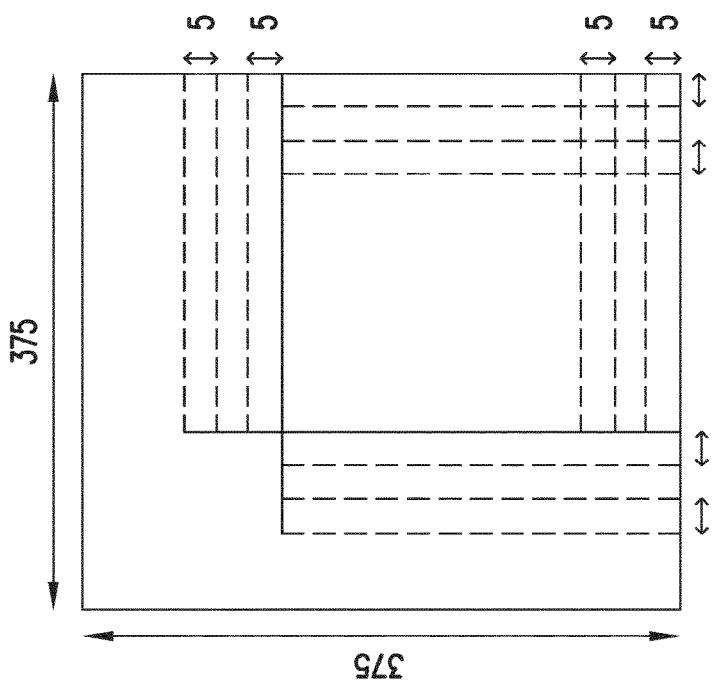
FIG. 25 illustrates additional steps of the fine registration process of FIG. 24.
Figure 25:
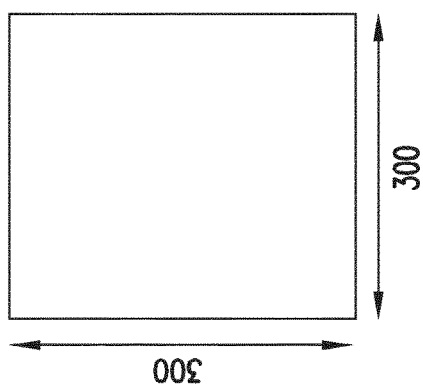

As shown in FIGS. 24 and 25:
- When point Q is marked in image 1, it is shown to correspond to point P in the big grid corresponding to image 1 (see FIG. 24 for definitions of points P and Q);
- If the coarse transformation is accurate, the best choice for the retrieved point will be close to P in the big grid;
- Consider a W×W (pixels×pixels) (let W=300) window around point P in the big grid to find the likely candidates for best matched point; in each case, consider an L×L (pixels×pixels) (let L=375) region around point P in the big grid considering image 1, and a L×L region around each new shifted point in the big grid considering image 2 (W=300 and L=375 are used in FIG. 25);
- Local Chamfer is done based on the local edge-maps in these L×L regions and the minimum cost window is selected to optimally shift the result of coarse matching;
- As an example: if L=W=75 and the best possible shifts are searched with an increment of 5 pixels, the total number of search points=$(75/5)^2$=225 (the choice of 5 is for computational complexity reduction; a shift of 1 pixel would have resulted in 75×5=5625 data points). From a computational point of view, computing the edge-map and the distance transformation of the edge-map for each of the 225 search point may be computationally intensive. Accordingly, in some embodiments, the possible computational issues are addressed by computing and storing the distance transformation of the entire edge-map; then, in some embodiments, suitable windows are cropped out of the edge-image and distance transformation image to speed up the computation. In some embodiments, suitable windows are large enough so that when two regions are compared in the two images, there is enough edge-based content in these windowed regions to clearly decide when the right window has been found in the second image for a given template window in the first image; if the window size is very small, the distance between "template window-to-search window" may be small enough that identifying the best window in the search image may be difficult; on the other hand, a higher window size will increase the computational complexity. Stated otherwise, edge-map computation and distance transformation for every edge-map (based on local regions) may be computationally intensive. Therefore, in some embodiments, edge-map is computed once for image 1 and image 2, after they are both mapped to big image grids, and then their distance transformation matrices are saved. In some embodiments, when local regions (windows) are considered, cropped versions of the edge-map and distance transform map are used. Accordingly, re-computing edge-maps and distance transformations maps for local regions may be avoided.
- The distance transform of a binary image (edge map image) may be computed using the formulation described in Borgefors, Gunilla, "Distance Transformations In Digital Images, Computer Vision, Graphics, and Image Processing, 34.3 (1986): 344-371, which is herein incorporated by reference in its entirety. As described in [0089], there is no unit associated with the distance transform. It is implied that the distance mentioned is in terms of the number of pixels. The distance transform value at a given image pixel is the distance from that pixel to the nearest ON image pixel (an ON pixel is a pixel with a value of 1 in an edge-map, i.e. it is an edge point).
- The size of the window depends on the size of the input annotation, marked by the user, or already present in image 1. For example, if the user has marked an annotation of size 60×70 pixels in the scale at which the analysis is done (e.g. 2× resolution), then the window size being used to compare a window in the source image (image 1) with its surrounding region in the target image is also 60×70. Once coarse registration is done, the two images are roughly aligned with each other and both the matched images are superimposed on the same grid, as shown in FIGS. 23, 24 and 25. This helps in searching a nearby region to find the best matched window, as demonstrated in FIG. 25.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft.NET framework. Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc. A number of embodiments have been described but a person of skill understands that still other embodiments are encompassed by this disclosure. It will be appreciated by those skilled in the art that changes could be made to the embodiments described above without departing from the broad inventive concepts thereof. It is understood, therefore, that this disclosure and the inventive concepts are not limited to the particular embodiments disclosed, but are intended to cover modifications within the spirit and scope of the inventive concepts including as defined in the appended claims. Accordingly, the foregoing description of various embodiments does not necessarily imply exclusion. For example, "some" embodiments or "other" embodiments may include all or part of "some", "other," "further," and "certain" embodiments within the scope of this invention.

The invention claimed is:

1. A computerized image registration process, comprising:
   a. selecting a first digital image of a first tissue section from a set of digital images of adjacent tissue sections;
   b. selecting a second digital image of a second tissue section from the set;
   c. matching tissue structure between the first digital image and the second digital image, said matching tissue structure comprising:
      a coarse registration mode comprising:
      generating a first gray-level tissue foreground image from the first digital image and generating a second gray-level tissue foreground image from the second digital image; computing a first tissue binary edge map from the first gray-level tissue foreground image and computing a second tissue binary edge map from the second gray-level tissue foreground image; and
   d. automatically mapping an annotation drawn on the first digital image to the second digital image.

2. A computerized image registration process according to claim 1, wherein the first digital image is derived from an image obtained using a stain and an imaging mode, and the second digital image is derived from an image obtained using at least one of a different stain, and a different imaging, as compared to the first digital image.

3. A computerized image registration process according to claim 2, wherein the stain is chosen from a hematoxylin and eosin stain ('HE' stain), ImmunoHistoChemistry stain ("IHC" stain) or Fluorescent stain.

4. A computerized image registration process according to claim 2, wherein the imaging mode is chosen from brightfield microscopy and fluorescent microscopy.

5. A computerized image registration process according to claim 1, wherein said course registration mode further comprising: computing global transformation parameters to align the first binary edge map and the second binary edge map; and, mapping the first digital image and the second digital image to a common big grid encompassing both the first and second digital images based on the global transformation parameters.

6. A computerized image registration process according to claim 5, wherein computing global transformation parameters comprises using a moments-based mapping method to generate an affine mapping between the first binary edge map and the second binary edge map.

7. A computerized image registration process according to claim 5, further comprising a fine registration mode to refine alignment of the first digital image and the second digital image.

8. A computerized image registration process according to claim 7, wherein the fine registration mode comprises: annotating the first digital image; mapping the annotation on the common big grid to a corresponding location in the second digital image; and, updating the location using Chamfer-distance matching based on the binary tissue edge maps.

9. A computerized image registration process according to claim 8, wherein cropped versions of the tissue edge binary maps are used and the method further comprises selecting a minimum cost window which improves matching relative to coarse mode registration.

10. An image registration system, comprising:
    a. a processor;
    b. a memory containing instructions for execution by the processor, which if executed results in one or more of: aligning one or more images of adjacent tissue sections based on matching tissue structure to result in a set of aligned images, wherein each of the one or more images is prepared using a different stain, a different imaging mode, or both; and, replicating an annotation made by a user on one of the aligned images on at least another of the aligned images, wherein aligning the one or more images comprises: computing a soft weighted foreground image from a digital image, extracting a binary tissue edge-map from the foreground image, computing global transformation parameters based on the tissue edge-map, and mapping the tissue edge-map to a common grid on the global transformation parameters;
c. a client user interface for triggering the processor to execute the instructions; and,
d. a monitor which can display the client user interface, the first image and the second image, the results and combinations thereof.

11. The image registration system according to claim 10, implemented on a workstation comprising at least one of a computer comprising the processor, the memory, the client user interface, and the monitor.

12. The image registration system according to claim 10, implemented on a computer network.

13. The image registration system according to claim 12, wherein the computer network comprises one or more client computers, a server, and a network-accessible database, all connected via a network, wherein the one or more client computers comprise the processor, the monitor, and the client user interface; the network-accessible database stores at least one set of images of adjacent tissue sections; and, the memory resides on the server or one or more client computers or both.

14. The image registration system according to claim 10, wherein aligning the one or more images further comprise: identifying a first region surrounding an annotation on a first aligned image, identifying a second region in a second aligned image, wherein the second region is larger than the first region and is co-located on common grid with the first region, optimizing the location of the first region in the second region using an iterative process based on distance transformation and minimum cost function calculations.

15. A computer program product for aligning images and mapping an annotation from one aligned image to another aligned image, the computer program product comprising: a tangible non-transitory computer readable storage medium comprising a computer readable program code which, when executed by a processor of a computer, causes the computer to match tissue structure between a first digital image from a set of digital images of adjacent tissue sections and a second digital image from the set of digital images of adjacent tissue sections, wherein each image in the set is obtained using a different stain, a different imaging mode, or both; and transfer an annotation from the first digital image to the second digital image based on the matched tissue structure,
wherein matching tissue structure comprises computing a soft weighted foreground image for each of the first and second digital image, extracting a binary tissue edge-map for each of the first and second foreground digital images, computing global transformation parameters based on the first and second tissue edge-maps, and mapping the first image and the second image to a common grid based on the global transformation parameters, wherein the common grid has a center, and the first foreground image and the second foreground image each have a center, and the first and second foreground images are laid on the common grid such that the center of the common grid coincides with the center of the first foreground image and the center of the second foreground image.

16. A computer program product according to claim 15, wherein transferring an annotation comprises mapping an annotation on the first digital image to a corresponding location on the second image as determined by the common grid.

17. A computer program product according to claim 16, wherein the transferring the annotation further comprises: adjusting the location of the annotation on the second image based on a fine registration process comprising defining a first window around the annotation on the first image; defining a second window around the annotation on the second image, wherein the second window is larger than the first window; iteratively shifting a third window having the same size as the first window within the second window; computing an optimized location for the third window based on distance transformation and cost function calculations for each position of the third window; and, adjusting the location of the annotation in the second image based on the optimized location of the third window.

18. A method for mapping an annotation from a first digital image from a set of digital images of adjacent tissue sections to a second digital image of the set of digital images of adjacent tissue sections, comprising:
a. selecting the first image from the set;
b. selecting the second image from the set;
c. annotating the first image;
d. instructing a computer processor to execute instructions resulting in aligning the first image with the second image on a common grid based on matching tissue structure, said aligning comprising:
computing a soft weighed foreground image for each of the first image and the second image, extracting a binary tissue edge-map for each of the first foreground image and second foreground image, computing global transformation parameters based on the first tissue edge-map and the second tissue edge-map, and, mapping the first image and the second image on a common grid based on the global transformation parameters; and
e. instructing the computer processor to transfer the annotation from the first image to the second image.

19. A method according to claim 18, wherein the instruction occurs automatically when the first image and the second image are aligned.

20. A method according to claim 18, wherein the common grid has a center, and each foreground image has a center, and the center of the common grid corresponds to the center of the foreground image for each of the first image and the second image.

21. A method according to claim 18, wherein transferring the annotation comprises, first mapping an annotation on the first image to the common grid, and then mapping the common grid annotation to a corresponding location on the second image.

22. A method according to claim 21, wherein annotation further comprises adjusting the location of the annotation on the second image based on a fine registration process comprising defining a first window around the annotation in the first image, defining a second window in the second image, wherein the second window is larger than the first window but is substantially co-located with the first window on the common grid, and computing an optimized location for the first window in the second window using an iterative process based on distance transformation and cost function calculations.

23. The method according to claim 18, wherein a user manually adjusts via a computer interface, at least one of a location, size and shape of the annotation transferred by the computer processor.

* * * * *